US007831318B2

(12) United States Patent
Bartee et al.

(10) Patent No.: US 7,831,318 B2
(45) Date of Patent: Nov. 9, 2010

(54) MODEL PREDICTIVE CONTROL OF FERMENTATION TEMPERATURE IN BIOFUEL PRODUCTION

(75) Inventors: James F. Bartee, Stilesville, IN (US); Maina A. Macharia, Round Rock, TX (US); Patrick D. Noll, Richardson, TX (US); Michael E. Tay, Georgetown, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 346 days.

(21) Appl. No.: 11/928,344

(22) Filed: Oct. 30, 2007

(65) Prior Publication Data
US 2008/0108048 A1 May 8, 2008

Related U.S. Application Data

(60) Provisional application No. 60/917,916, filed on May 14, 2007, provisional application No. 60/863,759, filed on Oct. 31, 2006.

(51) Int. Cl.
*G05B 13/04* (2006.01)
*G05B 19/04* (2006.01)
*G05B 19/418* (2006.01)
*C12M 1/38* (2006.01)

(52) U.S. Cl. .................. 700/29; 700/33; 700/45; 700/50; 703/11; 435/303.1

(58) Field of Classification Search ... 435/289.1–309.4; 422/105–116
See application file for complete search history.

(56) References Cited

U.S. PATENT DOCUMENTS 4,309,254 A * 1/1982 Dahlstrom et al. ............ 203/47
4,316,956 A * 2/1982 Lutzen ......................... 435/96
4,626,321 A * 12/1986 Grethlein et al. .............. 203/26
4,736,320 A * 4/1988 Bristol ........................ 717/109
4,889,812 A * 12/1989 Guinn et al. ............... 435/286.7

(Continued)

OTHER PUBLICATIONS

Fortman, J. et al. Biofuel alternatives to ethanol: pumping the microbial well. Trends in Biotechnology 26, 375-381 (2008).*

(Continued)

*Primary Examiner*—Michael Borin
*Assistant Examiner*—Soren Harward
(74) *Attorney, Agent, or Firm*—Fletcher Yoder LLP; William R. Walbrun; John M. Miller

(57) ABSTRACT

A system and method are provided for controlling temperature of a batch fermenter in a biofuel production process. A nonlinear predictive integrating temperature model for a batch fermentation process is provided that is a function of fermenter level. An objective for the batch fermentation process specifying a target fermenter temperature for the batch fermentation process is received, as is process information for the batch fermentation process, including fermenter level and fermenter temperature. The nonlinear predictive integrating temperature model is executed in accordance with the objective using the process information as input to determine target values for manipulated variables for controlling fermenter temperature of the batch fermentation process. The fermenter temperature for the batch fermentation process is controlled in accordance with the target values to produce biofuel in accordance with the objective, to substantially optimize the end of batch biofuel yield.

16 Claims, 8 Drawing Sheets

U.S. PATENT DOCUMENTS

| | | | |
|---|---|---|---|
| 5,036,005 | A | 7/1991 | Tedder |
| 5,177,008 | A * | 1/1993 | Kampen ..................... 435/139 |
| 5,407,817 | A * | 4/1995 | Lightsey et al. ............. 435/165 |
| 5,477,444 | A * | 12/1995 | Bhat et al. .................... 700/48 |
| 5,593,890 | A * | 1/1997 | Flores-Cotera et al. ... 435/286.5 |
| 5,932,456 | A * | 8/1999 | Van Draanen et al. ........ 435/144 |
| 6,510,368 | B1 * | 1/2003 | Beardwood et al. ......... 700/266 |
| 6,609,119 | B1 * | 8/2003 | Meghlaoui .................... 706/25 |
| 6,792,336 | B1 * | 9/2004 | Johnson et al. ............. 700/266 |
| 6,934,931 | B2 | 8/2005 | Plumer et al. |
| 2002/0077711 | A1 | 6/2002 | Nixon et al. |
| 2003/0040642 | A1 | 2/2003 | Goto et al. |
| 2004/0023349 | A1 * | 2/2004 | Bisgaard-Frantzen et al. ............. 435/161 |
| 2004/0166026 | A1 * | 8/2004 | Bratcher et al. ............... 422/99 |
| 2005/0112739 | A1 * | 5/2005 | Golubkov ................... 435/161 |
| 2005/0233030 | A1 * | 10/2005 | Lewis et al. .................... 426/49 |
| 2006/0093718 | A1 * | 5/2006 | Jurkovich et al. ........... 426/524 |
| 2006/0225350 | A1 | 10/2006 | Spallone et al. |
| 2007/0078530 | A1 * | 4/2007 | Blevins et al. ................. 700/29 |
| 2007/0089356 | A1 * | 4/2007 | Krasutsky et al. ............. 44/605 |
| 2007/0161095 | A1 * | 7/2007 | Gurin ......................... 435/134 |
| 2007/0218541 | A1 * | 9/2007 | Denney et al. .............. 435/267 |
| 2008/0103747 | A1 | 5/2008 | Macharia et al. |
| 2008/0103748 | A1 | 5/2008 | Axelrud et al. |
| 2008/0104003 | A1 | 5/2008 | Macharia et al. |
| 2008/0109100 | A1 | 5/2008 | Macharia et al. |
| 2008/0109200 | A1 | 5/2008 | Bartee et al. |
| 2008/0167852 | A1 | 7/2008 | Bartee et al. |

OTHER PUBLICATIONS

Kamm, B. & Kamm, M. Principles of biorefineries. Applied Microbiology and Biotechnology 64, 137-145 (2004).*

Marchetti, J., Miguel, V. & Errazu, A. Possible methods for biodiesel production. Renewable and Sustainable Energy Reviews 11, 1300-1311 (2007).*

Qin, S. A survey of industrial model predictive control technology. Control Engineering Practice 11, 733-764 (2003).*

U.S. Appl. No. 12/052,117, filed Mar. 20, 2008, Stephenson et al.
U.S. Appl. No. 12/052,159, filed Mar. 20, 2008, Stephenson et al.
U.S. Appl. No. 12/165,371, filed Jun. 30, 2008, Macharia et al.
U.S. Appl. No. 12/242,531, filed Sep. 30, 2008, Macharia et al.
U.S. Appl. No. 12/242,568, filed Sep. 30, 2008, Macharia et al.
U.S. Appl. No. 12/242,606, filed Sep. 30, 2008, Macharia et al.
U.S. Appl. No. 12/242,635, filed Sep. 30, 2008, Macharia et al.

Jalel, et al., "Modelling and control of the fed batch fermentation process using statistical techniques", Control Applications, 1994., Proceedings of the Third IEEE Conference on Volume, Issue, Aug. 24-26, 1994 pp. 1929-1933 vol. 3.

Gee, et al., "Optimal temperature control for batch beer fermentation", Biotechnol. & Bioeng., 31, 224-234, Year: 1988.

De Andres-Toro, et al., "Optimization of a Batch Fermentation Process by Genetic Algorithms", Departamento de Informatica y Automatica, Universidad Complutense de Madrid, 6 pages, Year: 1997.

De Andres-Toro, B., et al., "Evolutionary Optimization of an Industrial Batch Fermentation Process", European Control Conference, 1997, http://www.cds.caltech.edu/conferences/related/ECC97/proceeds/501_750/ECC615.PDF, 6 pages.

De Andres-Toro, B, J.M Giron-Sierra, J.A. Lopez-Orozco, C. Ferandez-Conde, "Application of genetic algorithms and simulations for the optimization of batch fermentation control", Systems, Man, and Cybernetics, 1997. 'Computational Cybernetics and Simulation'., 1997 IEEE International Conference on Oct. 12-15, 1997, vol. 1, pp. 392-397.

Madar, Janos, Janos Abonyi, Balaz Balasko, Ferenc Szeifert, "Interactive Evolutionary Computation for Model Based Optimization of Batch Fermentation", European Control Conference, 1997, 6 pages.

Xiao, Jie, Ze-Kui Zhou, Guang-Xin Zhang, "Ant colony system algorithm for the optimization of beer fermentation control", Journal of Zhejiang University Science, ISSN 1009-3095, 2004, 5(12): pp. 1597-1603.

Chang, Raymond. "Physical Chemistry for the BioSciences; Chapter 10: Enzyme Kinetics", University Science Books, 2005, pp. 363-400..

Lin, Yan, Shuzo Tanaka, "Ethanol fermentation from biomass resources: current state and prospects", Appl. Microbiol. Biotechnol., 69: 627-642, 2006.

Lee, C.-G., C.H. Kim, S.K. Rhee, "A kinetic model and simulation of starch saccharification and simultaneous ethanol fermentation by amyloglucosidase and Zymomonas mobilis", Bioprocess Engineering 7, 1992, 335-341.

"Liquefaction of starch from dry-milled grains", Novozymes, 2004, 5 pages.

De Andres-Toro, B., J.M. Giron-Sierra, P. Fernandez-Blanco, J.A. Lopez-Orozco, E. Besada-Portas, "Multiobjective optimization and multivariable control of the beer fermentation process with the use of evolutionary algorithms", Journal of Zhejiang University Science, ISSN 1009-3095, 2004, 5(4): pp. 378-389.

De Andres-Toro, B., J.M. Giron-Sierra, J.A. Lopez-Orozco, C. Fernandez-Conde, J.M. Peinado, F. Garcia-Ochoa, "A kinetic model for beer production under industrial operational conditions", Mathematics and Computers in Simulation 48, 1998, pp. 65-74.

"Enzymes that make glucose from liquefied grains", Novozymes, 8 pages.

"Improved ethanol production with Sprizyme Fuel", Novozymes, 2 pages.

"Using enzymes in ethanol production", Novozymes, 119 pages.

"Enzyme kinetics and the Michaelis-Menten equation", http://www.le.ac.uk/by/teach/biochemweb/tutorials/michment2print.html, 8 pages.

* cited by examiner

MODEL PREDICTIVE CONTROL OF FERMENTATION TEMPERATURE IN BIOFUEL PRODUCTION

PRIORITY DATA

This application claims benefit of priority to U.S. Provisional Application Ser. No. 60/917,916 titled "Nonlinear Model Predictive Control of a Biofuel Fermentation Process" filed May 14, 2007, whose inventors were James F. Bartee and Patrick Noll.

This application also claims benefit of priority to U.S. Provisional Application Ser. No. 60/863,759 titled "Model Predictive Control of a Biofuel Production Process" filed Oct. 31, 2006, whose inventors were Michael E. Tay, Maina A. Macharia, Celso Axelrud, and James Bartee.

FIELD OF THE INVENTION

The present invention generally relates to the field of model predictive control of production processes for biofuel and its co-products. More particularly, the present invention relates to systems and methods for model predictive control of a fermentation process in a biofuel production process.

DESCRIPTION OF THE RELATED ART

History of Biofuel

Biofuel refers to any fuel derived from biomass, i.e., from recently living organisms or their bi-products. Biofuel was used in automobiles from approximately 1876-1908. The Otto Cycle (1876) was the first combustion engine designed to use alcohol and gasoline. Henry Ford's Model T (1908) was designed to use biofuel, gasoline, or any combination of the two fuels. However, high government tariffs on alcohol discouraged the use of biofuel, and gasoline became the predominant fuel choice for automobiles for many decades.

The energy crisis of the 1970s renewed the search for an alternative to fossil fuels. The Energy Tax Act of 1978 (H.R. 5263) provided a 4 cents per gallon exemption from Federal excise taxes to motor fuels blended with biofuel (minimum 10 percent biofuel) and granted a 10% energy investment tax credit for biomass-biofuel conversion equipment (in addition to the 10% investment tax credit available) that encouraged plant building. However, by 1985, only 45% of the 163 existing commercial biofuel plants were operational. This high plant failure rate was partially the result of poor business judgment and inefficient engineering design. In 1988, biofuel was used as an oxygenate in Denver, Colo., which mandated the use of oxygenated fuels during winter use. Oxygenated fuels are fuels that have been infused with oxygen to reduce carbon monoxide emissions and NOx emissions created during the burning of the fuel. The Clean Air Act in the 1990s, motivated an additional increase in the use of biofuel as a pollution control additive.

The US Congress passed the Clean Air Act Amendments of 1990, which mandated the use of "reformulated gasoline" containing oxygenates in high-pollution areas. Starting in 1992, Methyl Tertiary Butyl Ether (MTBE) was added to gasoline in higher concentrations in accordance with the Clean Air Act Amendments. Improvements in air quality in many areas has been attributed to the use of gas reformulated with MBTE. However by 2000, MTBE—(a known carcinogenic agent) was found to have contaminated groundwater systems, mostly through leaks in underground gasoline storage tanks. In 2004, California and New York banned MTBE, generally replacing it with ethanol. Several other states started switching soon afterward. The 2005 Energy Bill required a phase out of MTBE and did not provide legal protection for the oil companies. As a result, the oil companies began to replace MTBE with ethanol (one embodiment of a biofuel), thereby spurring growth in the biofuel industry.

Since 2001, there has been a steady rise in crude oil prices that has increased the price of gasoline above the break-even point of the cost of production of biofuel. This has been very beneficial to Mid-west agricultural regions that have always sought ways to diversify demand for agricultural goods and services. Biofuel plants that had depended on subsidies to be profitable are now transitioning to an economically viable venture for this corn-rich region.

Biofuel Production Plants

An exemplary high-level design of a biofuel production plant or process is shown in FIG. 1, which illustrates how biomass is processed through several stages to produce biofuel and one or more co-products. Biomass is first provided to a milling and cooking process, e.g., milling and cooking units 104, where water 102 (and possibly recycled water RW1 and RW2) is added and the biomass is broken down to increase the surface area to volume ratio. This increase in surface area allows for sufficient interaction of the water and biomass surface area to achieve a solution of fermentable sugars in water. The mixture, a biomass and water slurry, is cooked to promote an increase in the amount of contact between the biomass and water in solution and to increase the separation of carbohydrate biomass from the non-carbohydrate biomass. The output of the milling and cooking units 104 (i.e., the fermentation feed or mash) is then sent to a fermentation process, where one or more fermentation units 106 operate to ferment the biomass/water mash produced by the milling and cooking process.

As FIG. 1 indicates, the fermentation process may require additional water 102 to control the consistency of material to the fermentation units (also referred to herein as a fermenter or a fermentation tank). Biomass is converted by yeast and enzymes into a biofuel and by-products such as carbon dioxide, water and non-fermentable biomass (solids), in the fermentation units 106. The fermentation process is a batch process with multiple fermenters in parallel. In multi-fermenter plants, the batch start times are typically staggered in order to optimize the size of holding tanks and smooth out the flow of fermentation feed to the fermentation process and the flow of biofuel and stillage as output from the fermentation process. FIG. 2 illustrates an exemplary plot of active yeast and ethanol concentrations as a function of batch time for a fermentation batch. As may be seen, over the course of the batch, yeast concentrations grow rapidly to a peak, then decline over the remainder of the batch time. Simultaneously, ethanol concentration grows more slowly, and gradually approaches a relatively stable value as the yeast population dies off.

The output from the fermentation units 106 is sent to a distillation process, e.g., one or more distillation units 108, to separate biofuel from water, carbon dioxide, and non-fermentable solids. If the biofuel has to be dehydrated to moisture levels less than 5% by volume, the biofuel can be processed through a processing unit called a molecular sieve or similar processing units (including, for example, additive distillation such as cyclohexane that breaks a water/ethanol azeotrope). The finalized biofuel is then processed to ensure it is denatured and not used for human-consumption.

The distillation units 108 separate the biofuel from water. Water 102 is used in the form of steam for heat and separation, and the condensed water is recycled (RW1) back to the milling and cooking units 104, as shown in FIG. 1. Stillage (non-fermentable solids and yeast residue), the heaviest output of the distillation units, is sent to stillage processing for further development of co-products from the biofuel production process.

Stillage processing units 110 separate additional water from the cake solids and recycle this water (RW2) back to the milling and cooking units 104. There are a number of stillage processing options: stillage can be sold with minimal processing, or further processed by separating moisture from the solids product via one or more centrifuge units. From the centrifuge, the non-fermentable solids may be transported to dryers for further moisture removal. A portion of the stillage liquid (centrate) may be recycled back to the fermentation units 106; however, the bulk of the flow is generally sent to evaporator units, where more liquid is separated form the liquid stream, causing the liquid stream to concentrate into syrup, while solid stillage is sent to a drying process, e.g., using a drying unit or evaporator, to dry the solid stillage to a specified water content. The syrup is then sent to the syrup tank. Syrup in inventory can be processed/utilized with a number of options: it can be sprayed in dryers to achieve a specified color or moisture content; it can be added to the partially dried stillage product, or it can be is sold as a separate liquid product. The evaporator unit may have a water by-product stream that is recycled back to the front end (RW2), e.g., to the milling and cooking units 104.

Note that an energy center 112 supplies energy to various of the processing units, e.g., the milling and cooking units 104, the distillation 108 and mole-sieve units, and the stillage processing units. The energy center 112 may constitute a thermal oxidizer unit and heat recovery steam generator that destroys volatile organic compounds (VOCs) and provides steam to the evaporators, distillation units 108, cooking system units (e.g., in 104), and dehydration units. The energy center 112 is typically the largest source of heat in a biofuel plant Systems can be open or closed. An open loop system is a system that responds to an input, but the system is not modified because of the behavior of the output. An open loop system receives process input, and generates process output, with no feedback from output back to input. Open loop systems are only defined by the inputs and the inherent characteristics of the system or process. In the biofuel production process, the system may comprise the entire biofuel processing plant, one process section of the biofuel processing plant, such as the milling and cooking units, or a controller for a variable in a process such as the temperature of the cooking units.

In a closed loop system, the inputs are adjusted to compensate for changes in the output, where, for example, these changes may be a deviation from the desired or targeted measurements. The closed loop system senses the change and provides a feedback signal to the process input. The closed loop system receives process input and generates process output, but where at least a portion of the output is provided back to the input as feedback. Process units in the biofuel system may be closed loop systems if they need to be regulated subject to constraints such as product quality, energy costs, or process unit capacity.

Modern plants apply traditional and advanced controls to regulate complex processes to achieve a specific control objective. Traditional PID controllers and other control systems such as ratio controls, feed-forward controls, and process models may be used to control biofuel production processes (a PID is a control algorithm or device that uses three basic feedback control modes to act on a deviation from its control objective: proportional action control (P), integral action (I), and derivative (D) rate of change action). A DCS (distributed control system) will have many traditional control schemes set up to control the process unit variables at the local control level.

Most biofuel production facilities mill or steep corn, other grains, or other biomass (e.g. sugarcane), and mix this milled carbohydrate base with water from a variety of sources and quality.

Plants are currently implemented to provide some information to plant operators to enable them to increase or decrease the feed of fermentable sugar and starch concentrations to fermentation tanks. Plant operators monitor the target feed quality and percent solids in the fermentation feed and run the plants to achieve a target percent solids so that each fermentation batch is started with a rough approximation of the target percent solids and each fermentation process runs over a specific time period in an attempt to achieve an output with approximately the design target percent of biofuel. In addition, a recycle flow rate is typically managed to maintain tank inventory levels within safe operating limits, while providing sufficient water/liquid to mix with grain or other biomass solids to fill a fermentation tank within a targeted time period (i.e. fill a vessel of 180,000 gallons in 15 hours so that the fill rate would be 600 gallons per minute).

In addition, levels of various water sources tend to increase or decrease, and operators or level controllers may adjust flows to regain targeted levels. In general, these applications are controlled with flow, level or mill speed controllers (e.g., regulatory level controllers). Some applications of ratio controllers are used in current control systems (e.g., to monitor the ratio of enzyme flow rates to grain slurry flow rates).

Industrial control generally involves one or both of two different types of systems-stable systems, and unstable systems. These two types of systems respond differently to control, and so require different control strategies. More specifically, for a given control change, a stable system will generally transition to another stable state (possibly back to the initial state), whereas an unstable system will respond in an unstable manner.

FIGS. 3A and 3B illustrate exemplary control/response of stable systems over time. In FIG. 3A, a control signal is shown (bottom plot) along with a corresponding process response (top plot). As may be seen, the control signal starts at a first level, corresponding to an initial stable state of the process. When the control signal changes to a second (lower) state, the process rises in nonlinear fashion until a second steady state or equilibrium is reached. One example of such a process or system is a pressurized tank with an adjustable release valve. Thus, following the plot of FIG. 3A, the release valve is initially wide open, with a corresponding equilibrium pressure in the tank; then, the valve is partially closed, leading to a slow rise in tank pressure until equilibrium is reached at a higher pressure.

FIG. 3B illustrates another example of stable control/process response, where in response to control pulses, the process or system is perturbed, but fairly rapidly approaches a corresponding equilibrium value. As may be seen, in this example, the control signal includes a first (negative) pulse, in response to which the process begins to rise toward a corresponding equilibrium value, but then the control signal transitions to a positive pulse, in response to which the process falls toward another, lower, equilibrium state. Then, the control signal transitions back to the initial state, in response to which the process returns to its initial state, where it remains.

FIGS. 3C and 3D illustrate exemplary control/response of unstable systems over time. In FIG. 3C, the control signal starts at a first level, corresponding to an initial stable state of the process. When the control signal changes to a second (higher) state, the process declines in a linear fashion until a process limit is reached. One example of such a process or system is a pumped fluid tank level with an adjustable drain valve. Thus, following the plot of FIG. 3C, the drain valve is initially at a first setting, and the level of the tank is almost steady, i.e., the pump rate is substantially equal to the drain rate; then, the valve is opened significantly, allowing the fluid to drain more rapidly, leading to a linear decrease in tank level until the tank is empty (the process limit). In other words, once the drain rate (governed by the valve) exceeds the pump rate, the level will not equilibrate, but will fall until the level approaches zero.

FIG. 3D illustrates another example of unstable control/process response, where in response to control pulses, the process or system is perturbed, leading to unstable responses similar to that shown in FIG. 3C. Again, following the pumped tank with drain valve example of FIG. 3C, as FIG. 3D shows, the valve (control signal) starts at a setting that roughly balances the pump rate with the drainage rate, then changes to a more closed setting, i.e., such that the pump rate exceeds the drainage rate. As indicated, the tank level immediately begins to rise, and would continue to do so until some upper limit is reached, except that the valve is then opened to a degree where the drainage rate exceeds the pump rate, causing the level to decline in linear fashion. Finally, the valve is set back to its original position, in response to which the tank level will again roughly approach equilibrium.

Prior art approaches to controlling batch fermentation in biofuel production processes have generally relied on stable control strategies, where, for example, a control setting, such as an amount of cooling, results in a corresponding temperature. However, due to the complexities of batch fermentation, such strategies do not lead to optimal results.

For example, fermenters used in the fermentation process are typically large volume tanks that require continuous cooling, dependent on the amount of biological activity (e.g., of yeast). Biological processes start with lag, exponential growth and production followed by diminished production where either feedstock is depleted or product concentration is so high that metabolic activity is hindered (either through toxic concentrations, e.g., of ethanol, or general equilibrium conditions where cellular activity is reduced. In ethanol fermentation, as a sample biofuel, the simplest way in to estimate metabolic activity is to assume that ethanol production, e.g., concentration, is directly proportional to metabolic activity and cooling demand; see, e.g., FIG. 2, described above.

During the various phases of the fermentation process, e.g., filling, fermentation, and emptying or draining, a stable temperature is desired to maintain consistent optimal fermentation conditions. This is a challenge for several reasons:

1) Large volumes typical of fermentation tanks (fermenters) have slow temperature control dynamics.

2) Because metabolic activity is high during filling, nonlinear control is required because the effect of cooling is higher on temperature at low volumes (e.g., near empty) than on higher volumes (e.g., filled), and thus changes during the filling phase, and possibly during emptying.

3) The level of biological activity is variable across the batch and challenging to predict as yeast inoculation levels vary, sugar availability varies, and infection levels vary. Thus temperature or cooling demand to maintain temperature is the primary indicator of biological activity normally.

Thus, due to this complexity, improved systems and methods for biofuel production are desired.

SUMMARY OF THE INVENTION

Embodiments of a system and method are presented for controlling fermentation temperature in a fermentation process of a biofuel production process utilizing model predictive control (MPC). As used herein, the term biofuel refers to one or more biofuel products output from a biofuel production process.

An important insight regarding the fermentation process that contributed to the new control techniques disclosed herein is that this process acts as an integrating control system, rather than a stable control process, so that ultimately the controlled parameter is fermenter heat balance rather than temperature. Thus, as long as the amount of cooling applied to the fermenter is less than the heat generated by metabolic activity the temperature will increase (and vice versa). Thus, an integrating model of temperature based on heat balance (e.g., as opposed to a standard "stable control" temperature model) may be used to control the fermentation temperature, where changes in temperature are central to the control strategy.

A nonlinear predictive integrating temperature model for a fermentation process may be provided. In other words, a model may be provided that specifies or represents relationships between attributes or variables related to the temperature of the fermentation process, including relationships between inputs to the fermentation process and resulting outputs of the fermentation process. The nonlinear predictive integrating temperature model may be based on heat balance of the fermentation process, including a balance between available cooling and current fermentation heat generation. Note that the model variables may also include aspects or attributes of other processes or sub-processes that have bearing on or that influence operations of the fermentation process.

In preferred embodiments, the nonlinear predictive integrating temperature model (also referred to herein as simply "the predictive model" or "the temperature model") is a function of fermenter level (i.e., fermenter volume), because, as noted above, the temperature dynamics of the fermentation batch changes based on the volume of the fermenting biomass slurry. In preferred embodiments, the nonlinear predictive model is a multivariate model, e.g., the model represents or encodes relationships among multiple parameters, and is operable to receive multiple inputs, and generate multiple outputs.

The model may be of any of a variety of types. For example, the model may be or include one or more of: fundamental or analytical models (i.e., functional physics-based models), empirical models (such as neural networks or support vector machines), rule-based models, statistical models, standard MPC models (i.e., fitted models generated by functional fit of data), or hybrid models using any combination of the above models.

An objective for the fermentation process may be received. The objective may specify a desired outcome, result, behavior, or state, of the fermentation process, such as, for example, a desired throughput, quality, efficiency, product profile, behavior, or cost, among others. In preferred embodiments, the objective specifies a target fermentation temperature (or temperature profile or trajectory) that is substantially optimal for generation of biofuel, e.g., that is optimal for generation of ethanol by the yeast. In some embodiments, the objective may specify a balance between available cooling and current fermentation heat generation to stabilize fermentation temperature at the target temperature value.

Moreover, in some embodiments, an objective may include multiple components, i.e., may actually comprise a plurality of objectives and sub-objectives. In some embodiments, the objective may involve multiple variables, e.g., a ratio of variables. Moreover, in some embodiments, there may be a global objective, e.g., maximize production or profit, and multiple sub-objectives that may in some cases be at odds with the global objective and/or one another.

It should be noted that preferred embodiments of the present invention are specifically directed to controlling fermenter temperature to some specified target value (or trajectory), and that the particular means or method for determining the target temperature is not germane to the techniques described herein. In other words, given a target temperature (or temperature trajectory), the control techniques discussed herein will attempt to control the fermenter temperature to approach and maintain the target temperature, whatever that target temperature is, and however it may be have been determined.

Process information for the fermentation process of the biofuel production process may be received. This information may be received from the fermentation process, from other portions of the biofuel production process that influence the fermentation process, and/or from other sources, e.g., a laboratory, inferred property models (that model variables that are not readily measurable), sometimes referred to as virtual online analyzers (VOAs), external systems, or any other source as desired. This information generally includes data from one or more sensors monitoring conditions of and in the fermentation process (e.g., temperatures, pressures, flow rates, equipment settings, and so forth), although any other information germane to the fermentation process may be included as desired (e.g., constraints to which the fermentation process may be subject, ambient conditions of the biofuel process, economic or market data, and so forth). In preferred embodiments, the process information may include fermenter level and fermenter temperature, although the process information may also include other attributes or variables related to the fermentation process, as discussed below.

The nonlinear predictive integrating temperature model may then be executed in accordance with the objective using the received process information as input, to generate model output comprising target values for one or more manipulated variables related to the fermentation process in accordance with the objective for the fermentation process. In other words, the nonlinear predictive integrating temperature model may be executed with the received process information as input, and may determine target values for one or more variables or controllable attributes of the fermentation process in an attempt to meet the specified objective, specifically, to substantially meet and maintain the specified target fermentation temperature.

For example, in an embodiment where the objective is to maximize biofuel output for the fermentation process, the model may determine various target values (e.g., fermentation feed input flows, temperatures, pressures, and so forth) that may operate to maximize the output. As another example, in an embodiment where the objective is to minimize waste for the fermentation process, the model may determine target values that may operate to minimize waste for the fermentation process, possibly at the expense of total biofuel output. In a further example, the objective may be to maximize profit for the entire production process, where maximizing output and minimizing waste may be two, possibly competing, sub-objectives, e.g., included in the objective.

In one embodiment, constraint information specifying one or more constraints for the biofuel production process may be received, e.g., as part of the objective, or separately. Executing the nonlinear predictive integrating temperature model may then include determining the target values subject to the one or more constraints. Note that the constraints may include any limitations on various aspects, variables, or conditions, related to the fermentation process, possibly including dynamic constraints. For example, in various embodiments, the one or more constraints may include one or more of: equipment constraints, capacity constraints, temperature constraints, pressure constraints, energy constraints, market constraints, economic constraints, regulatory constraints, operating limits of product markets that affect production rates of products, and/or operator imposed constraints, among others.

In some embodiments, equipment constraints may include one or more of: operating limits for various pumps, operational status of pumps, holding tank capacities, operating limits for various control valves, operating limits for valve temperatures, operating limits for pipe pressures, operating temperature limits of equipment, operating limits of rotary equipment as measured by amperage, temperature, or other load measurement, and/or safety or environmental limitations for equipment operation. For example, in one embodiment, a constraint on operation of the fermentation feed may relate to pumping limitations on any of the various sections of the fermentation feed pumps and/or pipes. In situations where an objective is to maximize or maintain biofuel output product production rates, or biofuel product quality at certain target rates, this objective may drive a pump to its maximum or minimum limit, and the objective may then be compromised due to equipment/pump limits.

In one embodiment, the one or more equipment constraints may also include one or more of: fermentation equipment capacity limits that limit fermentation process output feed rates to the primary distillation units; equipment constraints that limit thin stillage feed rates or capacity from the stillage process; operating limits for one or more pumps in the thin stillage feed; operational status of pumps (online or offline); thin stillage tank capacities; holding tank level limits that limit feed rates to the fermentation tanks; operating limits for tank pressures; operational status of tanks; pump speed, valve position, or other controller output limits within the primary distillation or fermentation systems; operating limits for valve pressures; operating limits for valve temperatures; equipment amp limits; among others.

In some embodiments, the execution of the model in 608 may include executing the model in an iterative manner, e.g., via an optimizer, e.g., a nonlinear optimizer, varying manipulated variable values (which are a subset of the model inputs) and assessing the resulting model outputs and objective function, to determine values of the manipulated variables that satisfy the objective subject to one or more constraints, e.g., that optimize the sub-process subject to the constraints, thereby determining the target values for the manipulated variables.

Fermenter temperature of the fermentation process may be controlled in accordance with the corresponding targets and objective for the fermentation process, e.g., to substantially optimize (e.g., maximize) the end of batch biofuel yield. Said another way, a controller coupled to the nonlinear predictive model may automatically control various (controllable) aspects or variables of the fermentation process according to the target values output by the predictive model to attempt to achieve the specified objective, specifically, the target fermenter temperature.

The above method elements (or portions of the method elements) may be repeated, e.g., at a specified frequency, or in response to specified events, so that the process may be monitored and controlled throughout a production process, or throughout a series of production processes. In some embodiments, the period or frequency may be programmed or varied during the production process (e.g., an initial portion of a production process may have longer repetition periods (lower frequency), and a critical portion of a production process may have shorter repetition periods (higher frequency)). Thus, in some embodiments, the above receiving process information, executing the nonlinear predictive integrating temperature model, and controlling, may be repeated in an iterative manner to substantially optimize biofuel production over a fermentation batch.

Thus, various embodiments of the systems and methods described herein may be used to control fermentation in a biofuel production process in a substantially optimal manner.

BRIEF DESCRIPTION OF THE DRAWINGS

A better understanding of the present invention can be obtained when the following detailed description of the preferred embodiment is considered in conjunction with the following drawings, in which.

Figure 1:
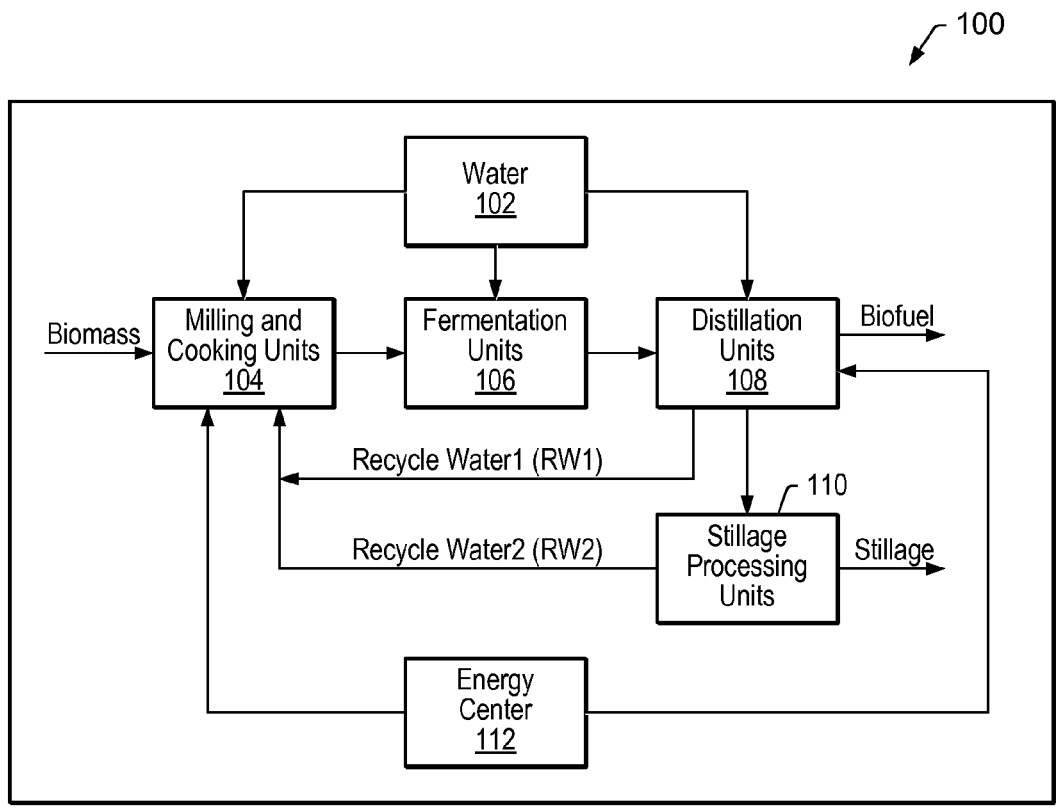
FIG. 1 illustrates one example of a biofuel processing plant, according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Provisional Application Ser. No. 60/917,916 titled "Nonlinear Model Predictive Control of a Biofuel Fermentation Process" filed May 14, 2007.

U.S. Provisional Application Ser. No. 60/863,759 titled "Model Predictive Control of a Biofuel Production Process" filed Oct. 31, 2006.

DEFINITIONS

Biofuel Production Processes

Biofuel—any fuel (or fuels) derived from biomass, i.e., from recently living organisms or their bi-products.

Biofuel production process—a fermentation process surrounded by auxiliary processing units to produce biofuel, other fermentable alcohols for fuel, and high-capacity food grade or chemical grade alcohols.

Biofuel production—a measure of biofuel production within or at the end of a production process. May include measurements such as concentration (e.g., wt. %, volume % or wt./vol. %), volume (e.g., current gallons biofuel within a fermenter) or mass (e.g., current kg biofuel within a fermenter).

Batch processing—a staged discontinuous processing step that includes a start and an end, in contrast to continuous processing that continues without stop, e.g., during a normal operating day or week. Continuous processing is generally represented by fairly steady targets or operations, where at least some parameters change throughout batch processing. For example, biofuel production, e.g., fermentation, starts at low levels at the start of a batch and increases throughout the batch with or without a drop at the end representing degradation rates being higher than production rates. Similarly, yeast cellular concentrations, start at fairly low levels, and generally grow throughout a batch, although they generally have a lag (relatively constant concentrations), exponential growth, stable growth, and degradation phase within a batch.

Slurry—a fermentation feed mash comprising a two-phase (liquid and solid) slurry that will be fermented.

Solids or % solids—fraction or percent of solids in the fermentation feed.

Milling and Cooking Process—continuous processing for pre-fermentation of the fermentation feed, which generally includes grain or cane milling, cooking, mixing with water and processing chemicals, cooking for sterilization and increasing water concentration within solids, and other pre-fermentation processing.

Biomass concentration—content attribute of the fermentation feed specified by one or more of: slurry solids, liquefaction solids, slurry density, liquefaction density, slurry % or fraction carbohydrates, and slurry % or fraction fermentable sugar.

Liquids inventory information—includes water flows, recycle liquid flows, evaporator condensate recycle flow, thin stillage or centrifuge liquor recycle flows, water addition flows, processed water addition flows, slurry flows, mash flows, and various levels or weights for various tanks used to hold inventories of these flows or for intermediate receptacles (e.g. methanator feed tank, slurry feed tank, liquefaction tank, distillate tank, grain silo inventories or other biomass inventories (not water), etc.).

Liquefaction—for grains with high starch content, the starch is liquefied to reduce its carbohydrate chain length and viscosity by adding enzymes or other biologic agents.

Thermal Oxidizer/Heat Recovery Steam Generator (HRSG)—process equipment that is used to destroy volatile organic compounds (VOCs), to reduce air and remove stenches from stillage dryer or evaporation systems. The heat recovery steam generator is used to recover the heat required to destroy the VOCs, and is typically the energy center of the biofuel production process.

Dried Distillers Grains (DDG)—post fermentation solid residue that includes undigested grain residue, other solid residues (enzymes, salts), and yeasts (or other cellular residue) that may be dried and released as a production by-product (generally as animal feed). DDG may also be used herein to include WDG (wet distillers grains), which are only partially dried for local consumption (e.g. without long-term biological stability) and DDGS/WDGS (dried distillers grains with solubles and wet distillers grains with solubles). Solubles includes residue solids that are soluble in water and therefore present in stillage concentrate. Solubles may be partially concentrated (generally with evaporation), and added to DDG or WDG to increase yields and manage by-product inventories.

Enzyme—highly selective biological-based catalyst added to manage specific reactions within a fermentation process. The most common enzymes used today include alpha amylase to rapidly break starches into dextrins, gluco-amylase to break dextrins into glucose, and proteases to break grain proteins into digestible proteins to support cell growth. In the same way as described below, modeling and controlling starch-based fermentations, enzymes specific for cellulosic conversion into biofuel or other enzymes affecting yeast (see below), growth or nutrient availability may be managed.

Yeast—a biofuel producing organism. Yeasts are currently the most commonly used organism in ethanol production although other biofuel producing organisms including genetically engineered E. coli can be substituted throughout as the technology described may not be specific to yeast, and may apply to many organisms used in fermentation processes to produce biofuel.

Active Yeast—refers to yeast as defined above that are actively consuming carbohydrates to produce biofuel. Unless otherwise specified, yeast as referred to in this document is by definition active yeast.

Stillage/Whole Stillage—non-fermentable solids and water liquid removed from the bottom of the primary distillation units.

Thin Stillage—the separated liquid from the stillage non-fermentable solids.

Backset—thin stillage that is recycled back to the fermentation feed line and thus introduced into the fermentation process.

Syrup—concentrated thin-stillage with a large portion of the moisture removed. The % solids in syrup are usually in the range of 20-45% solids, but percentages outside this range may occur.

Fermentation Gap—the cumulative sum of all fermentation tanks as well as the beer well. Represented as volume, % volume, level, % level or like designations.

Beer Well—repository of fermentation tank effluent. Holding tank between the fermentation section and distillation section of many biofuel processes, Azeotrope—a special mixture of two compounds, that when in equilibrium, the vapor phase and liquid phase have exactly the same compositions. This makes it difficult to separate the two components to achieve a better purity. Special separation processes are required to break the azeotrop. They comprise azeotropic distillation (add a $3^{rd}$ compound to break the azeotrop), extractive distillation (use a solvent to separate the 2 compounds), or molecular sieve technology (preferentially trap molecules of one component in a molecular sieve bed as the other component passes over the molecular sieve bed).

Volatile Organic Compounds (VOCS)—Organic compounds that tend to vaporize when subject to atmospheric pressure and ambient temperature ranges.

Capacity—capacity is the established maximum production rate of the process, sub-process, or unit under best operating conditions (no abnormal constraints). Capacity is generally a constant within the present capital investment. For new units it is the vendor's specified capacity. For established units, capacity is established by demonstrated historical production rates.

Model—an input/output representation, which represents the relationships between changes in various model inputs and how the model inputs affect each of the model outputs.

Control Model—an input/output representation of a system or process that determines how much an output changes when an input is changed, and may include instantaneous (steady-state) models as well as dynamic models, as defined above. Control models may be univariate (single input effect a single output) or multivariate (multiple inputs effecting multiple outputs).

Dynamic Predictive Model—an input/output representation of a system or process that not only reflects how much an output changes when an input is changed, but with what velocity and over what time-dependent curve an output will change based on one or more input variable changes. A dynamic multivariate predictive model is a dynamic predictive model that represents or encodes relationships among multiple parameters, and is operable to receive multiple inputs, and generate multiple outputs.

Model Predictive Control (or MPC)—use of multivariate dynamic process models to relate controller objectives (targeted controller outputs and constraints) with regulatory controllers (existing single-input/single-output controllers such as ratio flow, temperature, level, speed, or pressure controllers) over a predicted time interval (e.g., 1 minute, 30 minutes, 2 hours, 100 hours, etc.).

Objective Function—encodes an objective that sets the goal or goals for the overall operation of the process, sub-process, or unit. The objective function provides one or more consistent numerical metric(s) to which the process, sub-process, or unit strives to achieve and over which the performance of the process, sub-process, or unit may be measured, e.g., from a business.

Control Variables—(also called controlled variables) those variables that the controller/optimizer tries to bring to a specified value, e.g., to a target value, maximum, etc. The range of allowed values for each control variable may be limited by constraints.

Integrated Variables—integrated control variables are variables that are not stable, but integrate generally with a stable first derivative as a function of time. The most common integrated variable is a tank level where as long as inputs and outputs are imbalanced the level will increase or decrease. Thus, when balanced a change in an input or output flow will cause a tank to either overfill or drain as integrated over time.

A controller must use these integration calculations to determine when and how rapidly input or output flows must be adjusted.

Manipulated Variables—those variables over which the management of the process or unit has authority and control, e.g., via regulation of the process with online controllers, and which are changed or manipulated by the controller/optimizer to achieve the targets or goals of the control variables. Manipulated variables may operate within some range of controllable or fixed constraints. Manage is an alternate term for process control.

Disturbance Variable—a variable representing an external influence on a process that, in addition to objective variables and regulatory controllers, is outside the controller scope, and so it acts on the objective variables, but independently of the described controller. Disturbance variables are used in feed-forward disturbance rejection. Disturbance variables are also measured or unmeasured variables over which the management of the process or unit does not have direct authority or control. For example, temperature, humidity, upstream flow, or quality, may all be referred to as measured disturbance variables.

Set Point (targets)—also "setpoint"; the target signal or value for a manipulated variable or targeted controlled variable.

Constraints—Constraints represent limitations on particular operating variables or conditions that affect the achievable production rate of a production unit. Constraints are of two types: controllable and external, defined below. Constraints may include, but are not limited to: safety constraints, equipment constraints, equipment availability constraints, personnel constraints, business execution constraints, control constraints, supply chain constraints, environmental permit and legal constraints. Safety constraints ensure the safety of equipment and personnel. Equipment constraints, such as the maximum open position of a control valve, maximum tank capacity, etc., may limit the physical throughput of the unit. Equipment availability constraints may include, but are not limited to: readiness due to maintenance planning and scheduling, or due to unexpected equipment outages, authorized production level set by the supply chain and production scheduling systems. Personnel constraints refer to limitations on the availability of staffing and support functions, business rules and constraints imposed by contract and policy. Business execution constraints are limits imposed by the time required to execute associated business and contractual tasks and obligations. Control constraints are limits on the maximal position and rate of change of manipulated variables. Supply chain constraints are limits on the availability of raw materials, energy, and production supplies. Environmental permit and legal constraints are limits on air emissions, wastewater, waste disposal systems, and/or environmental constraints imposed upon the performance of the unit, such as river levels and current weather imposed limitations.

Controllable Constraints—constraints imposed on the performance of a process or unit over which the management of the process or unit does have authority and discretionary control. For example, the separation in a distillation tower may be affected by distillation tray fouling. The tray fouling is a function of how the feedstock is processed, and how often the unit is taken offline for cleanup. It is management's discretion as to when the unit is serviced. Controllable constraints change a unit's throughput capacity.

External Constraints—limitations imposed on the performance of the process, sub-process, or unit over which the management of the process, sub-process, or unit does not have authority or discretionary control. These external constraints come in two types: external constraints that are controllable by other entities or processes in the plant or in the supply chain, and those constraints that are imposed by physical, safety, environmental, or legal constraints and are not controllable by anyone in the plant or supply chain.

System—a system may be defined by the inputs and the characteristics of the system or process. In the biofuel production process, the system may be defined for: the entire biofuel production process, a sub-process of the biofuel production process such as the milling and cooking process, or control of a variable in a sub-process such as the cooking temperature.

Figure 2:
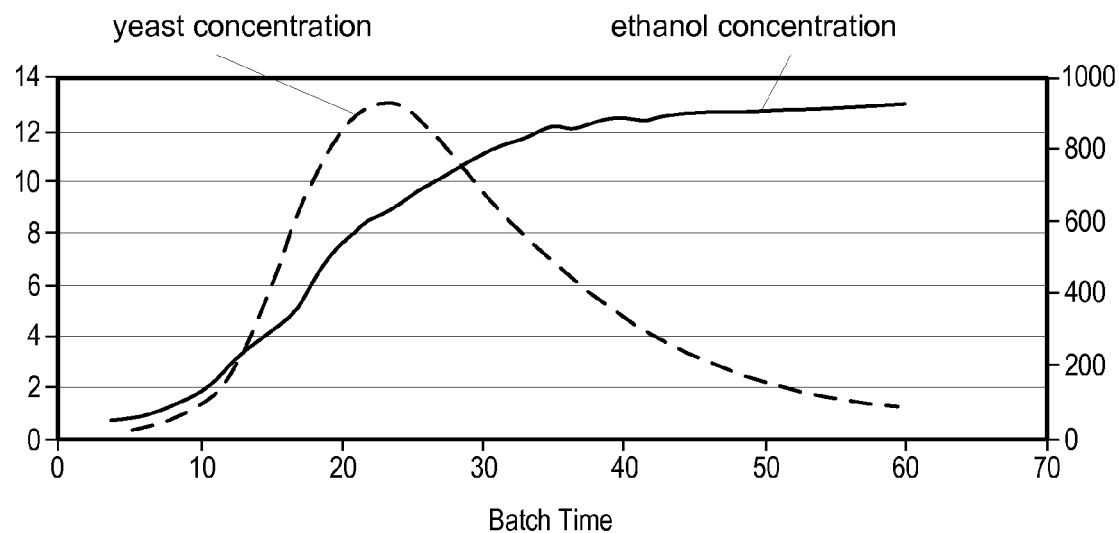
FIG. 2 illustrates an exemplary plot of active yeast and ethanol concentrations as a function of batch time, according to the prior art.
Figure 3A:
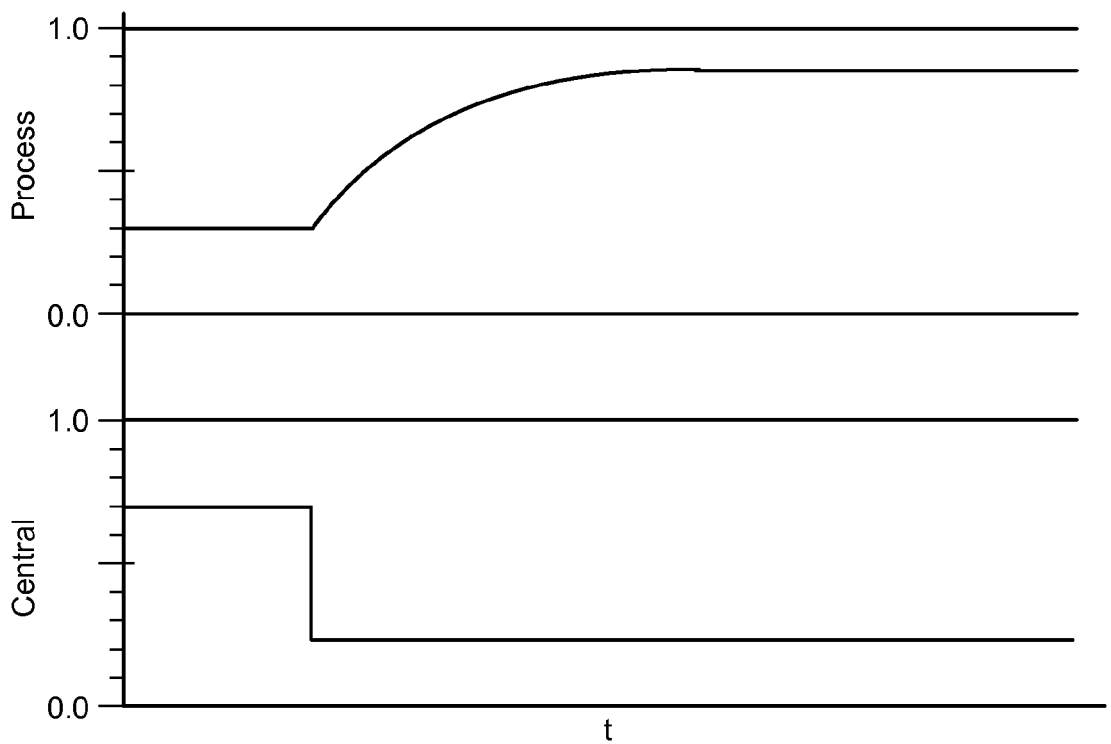
FIGS. 3A and 3B illustrate control of stable systems, according to the prior art.
Figure 3B:
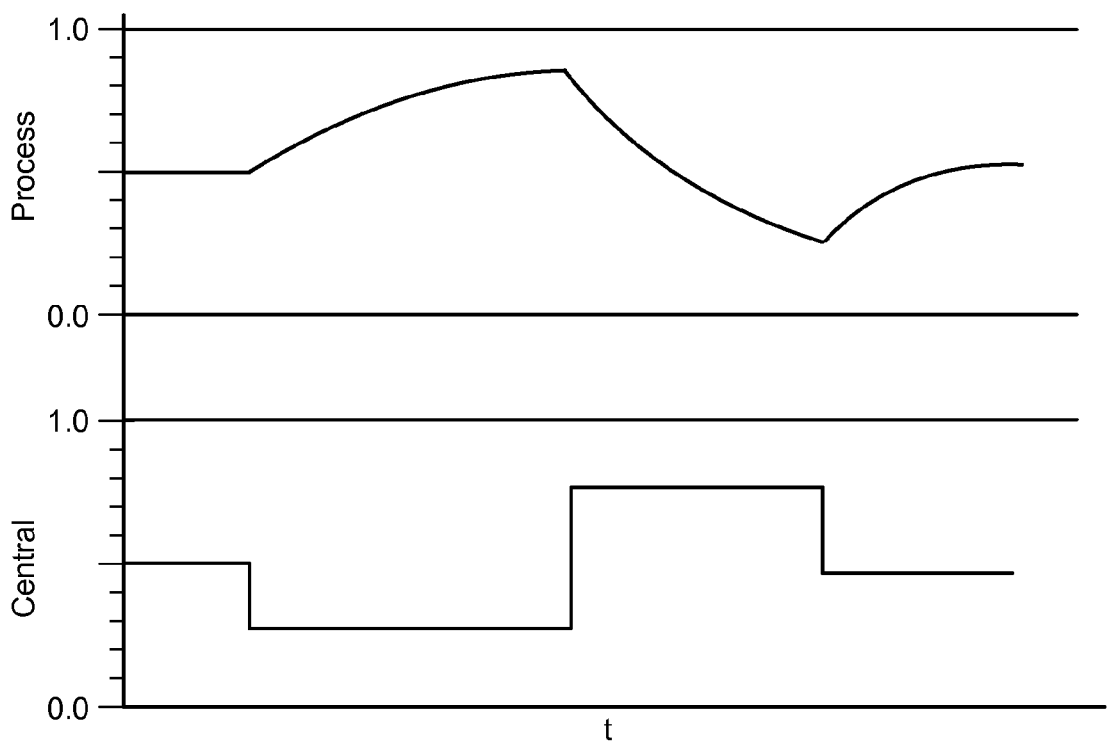
Figure 3C:
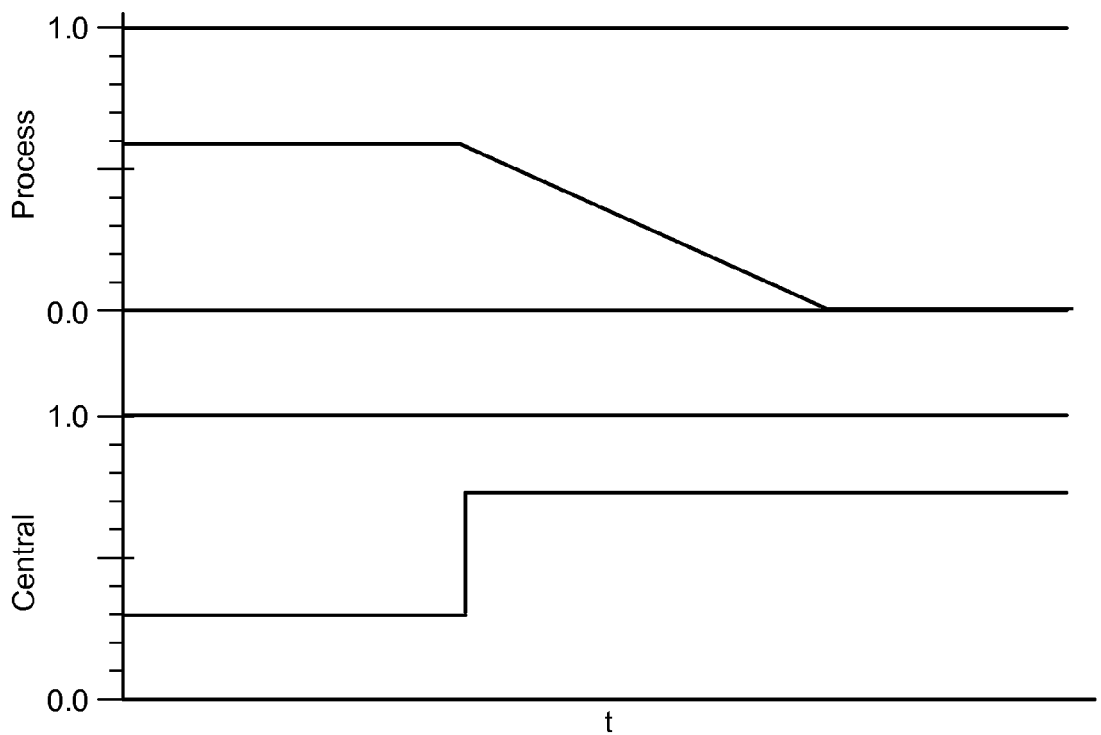
FIGS. 3C and 3D illustrate control of unstable systems, according to the prior art.
Figure 3D:
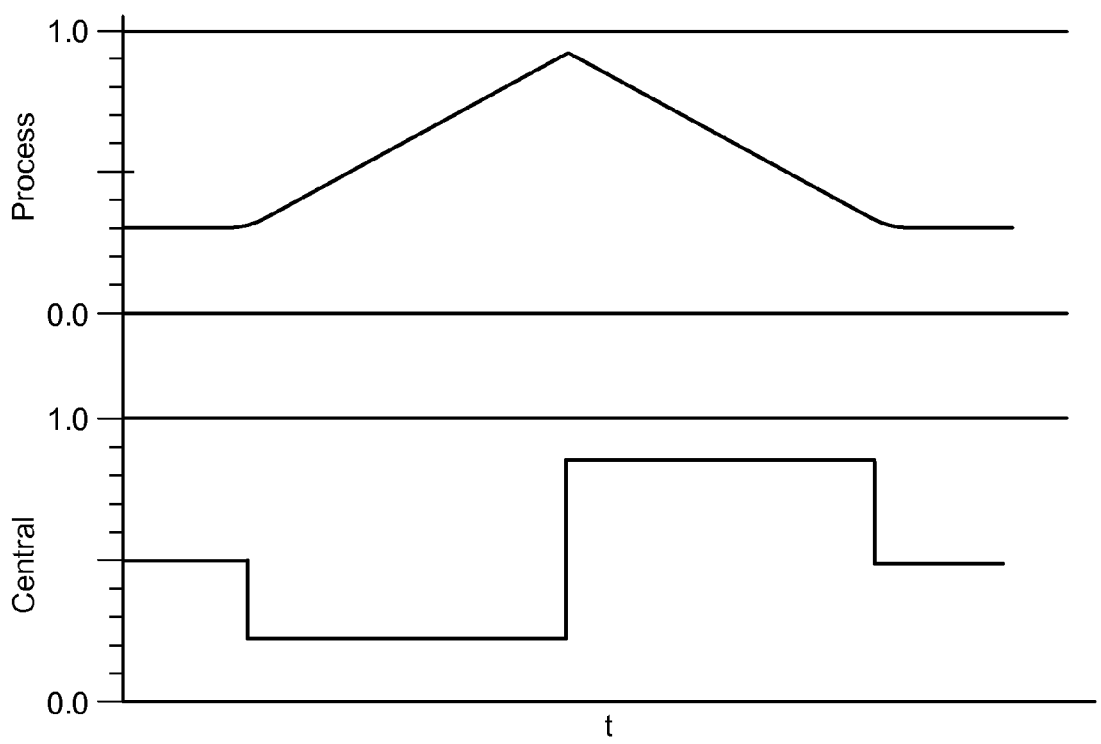

Open Loop Systems—are systems that respond to an input, but the system is not modified because of the behavior of the output (see FIG. 2). For example, in a biofuel system, a reciprocating pump will operate and move at a fixed volume of syrup independent of the upstream and downstream pressure if the reciprocating pump does not have a pressure control system.

Closed Loop Systems—system inputs may be adjusted to compensate for changes in the output. These changes may be a deviation from an objective for the system, impacts of constraints on the system or system variables, or measurements of output variables. The closed loop system may be used to sense the change and feedback the signal to the process input. In biofuel systems, closed loop systems may predominate, since these systems may be regulated subject to constraints such as production (product) quality, energy costs, process unit capacity, etc.

Control System—the regulatory level mechanism by which the manipulated variables are driven to the set points.

Response—the measurement of the current position of the manipulated variable. The response is the feedback of the movement of the manipulated variable to the set point in response to the actions of the control system in its effort to achieve the set point.

Target Profile or Trajectory—a desired profile or trajectory of variable values, i.e., a desired behavior of a control variable or a manipulated variable.

Control Horizon—the period of the time extending from the present into the future during which one plans to move or change manipulated variables. Beyond this horizon the MV is assumed to stay constant at its last or most recent value in the control horizon.

Prediction Horizon—the period of time extending from the present into the future during which the process or system response is monitored and compared to a desired behavior.

Cloning—the process of exercising a fundamental model over a desired range of inputs and outputs and using the results to create a neural network model.

Exemplary Batch Fermentation Process

Figure 4:
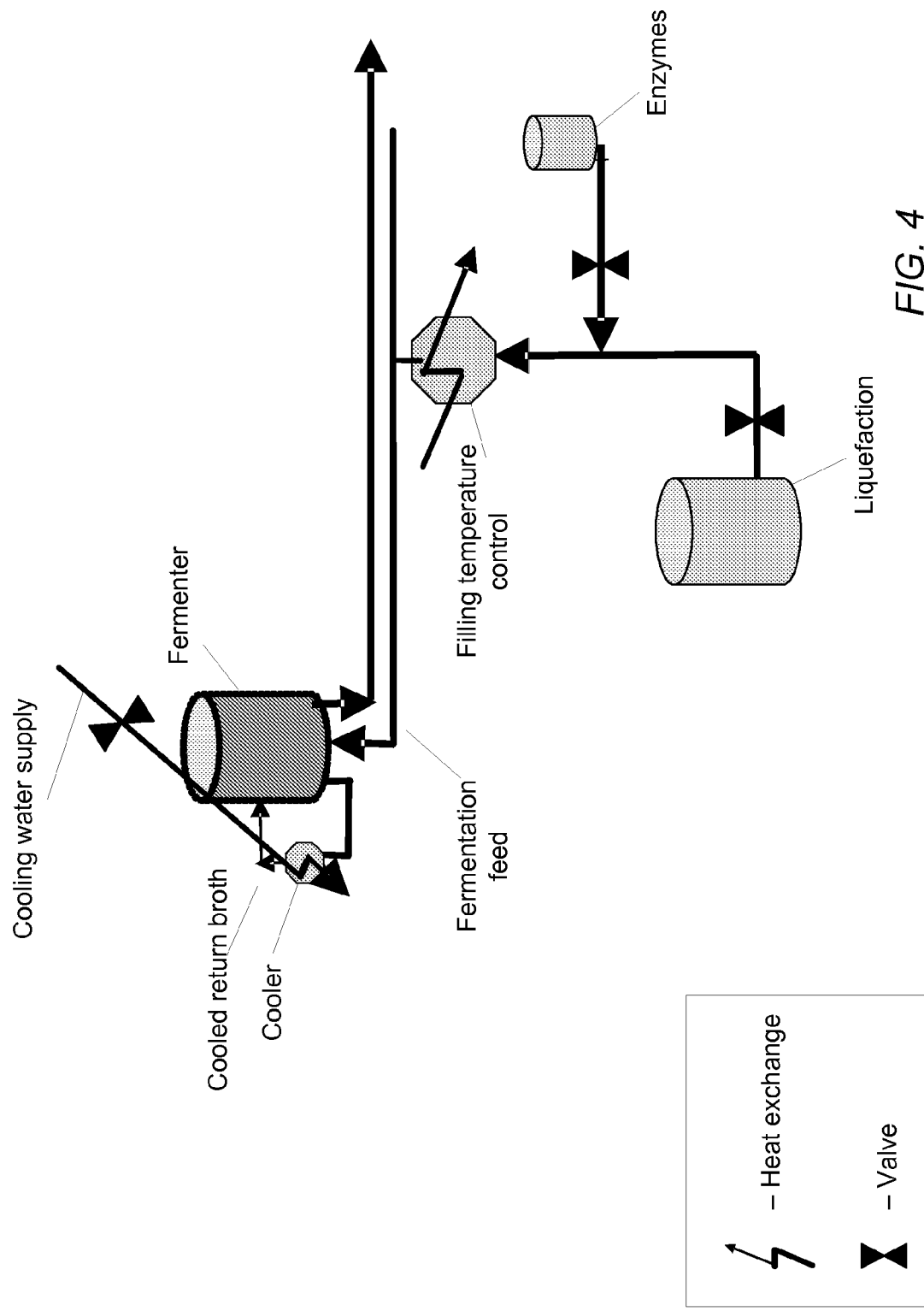
FIG. 4 illustrates an exemplary high-level processing flow schematic of a fermentation process, according to one embodiment.

FIG. 4 illustrates an exemplary high-level processing flow of a fermentation process in a biofuel production process, according to one embodiment. It should be noted that the particular components and sub-processes shown are meant to be exemplary only, and are not intended to limit embodiments of the invention to any particular set of components or sub-processes.

As FIG. 4 indicates, a liquefaction tank may provide a biomass slurry (also referred to as a fermentation feed or a fermentation feed slurry) to a fermenter, where enzymes may be added to the fermentation feed prior to or during the filling of the fermenter tank. As also indicated, the temperature of the fermentation feed (the biomass slurry) may be adjusted via filling temperature control during the filling phase. As noted above, fermentation may be in progress during the filling phase. As shown, the fermentation temperature (in the fermenter) may be controlled, e.g., via a cooler, which may use a cooling water supply to indirectly cool broth extracted from the fermenter, and return the cooled broth to the fermenter, thereby cooling the fermenting biomass. As FIG. 4 indicates, the fermentation feed, the enzymes, and the cooling water supply may all be controlled via adjustable valves. Once the fermentation process is complete, the fermenter (tank) may be drained, and prepared for another batch.

It should be noted that in various embodiments, the fermentation process equipment may include a single fermentation tank, a few fermentation tanks, or many fermentation tanks, depending on the size of the biofuel production plant. Similarly, one or more coolers, also referred to as chillers, may be coupled to the fermentation tanks, and provide cooling to the fermenting slurry inside the fermentation tanks through indirect heat exchangers, as described above. Moreover, various pumps, controllers, and sensors (not shown) may also be used in the fermentation process. Thus, the simplified fermentation process shown in FIG. 4 is intended to be illustrative only, and is not intended to accurately represent all the complexities of an actual fermentation process.

MPC Applied to the Batch Fermentation Process

Various embodiments of systems and methods for applying model predictive control (MPC) to a biofuel production process are described below. In this approach to biofuel production, a, e.g., a nonlinear multivariate predictive model, may be incorporated as a process model in a nonlinear predictive model-based controller. This MPC system may project or predict what will happen in the production process (e.g., in the near future) based on the nonlinear prediction model and recent process history, including, for example, recent operating conditions or state values. This projection or prediction may be updated or biased based on received current process information, specified objectives, and/or system or method constraints. Control algorithms may be used to recursively or iteratively estimate the best current and future control adjustments on the model inputs to achieve a desired output path. Targets set on the nonlinear model outputs may be compared to how that output may behave over a predictive future horizon and the best available controllable model input adjustments may be estimated to best achieve the controller targets.

It should be noted that the biofuel produced by embodiments of the methods described herein may be any biofuel generated from biomass, and that the types of biomass contemplated may be of any type desired, including, but not limited to, grains (e.g., corn, wheat, rye, rice, etc.), vegetables (e.g., potatoes, beats, etc.), canes (e.g., sugarcane, sorghum, etc.), and other recently living organisms and/or their biproducts. Similarly, while the descriptions herein may refer to fuel ethanol, it should be noted that this is but an exemplary biofuel, and that production of other biofuels is also contemplated as being within the scope of the present invention.

Figure 5:
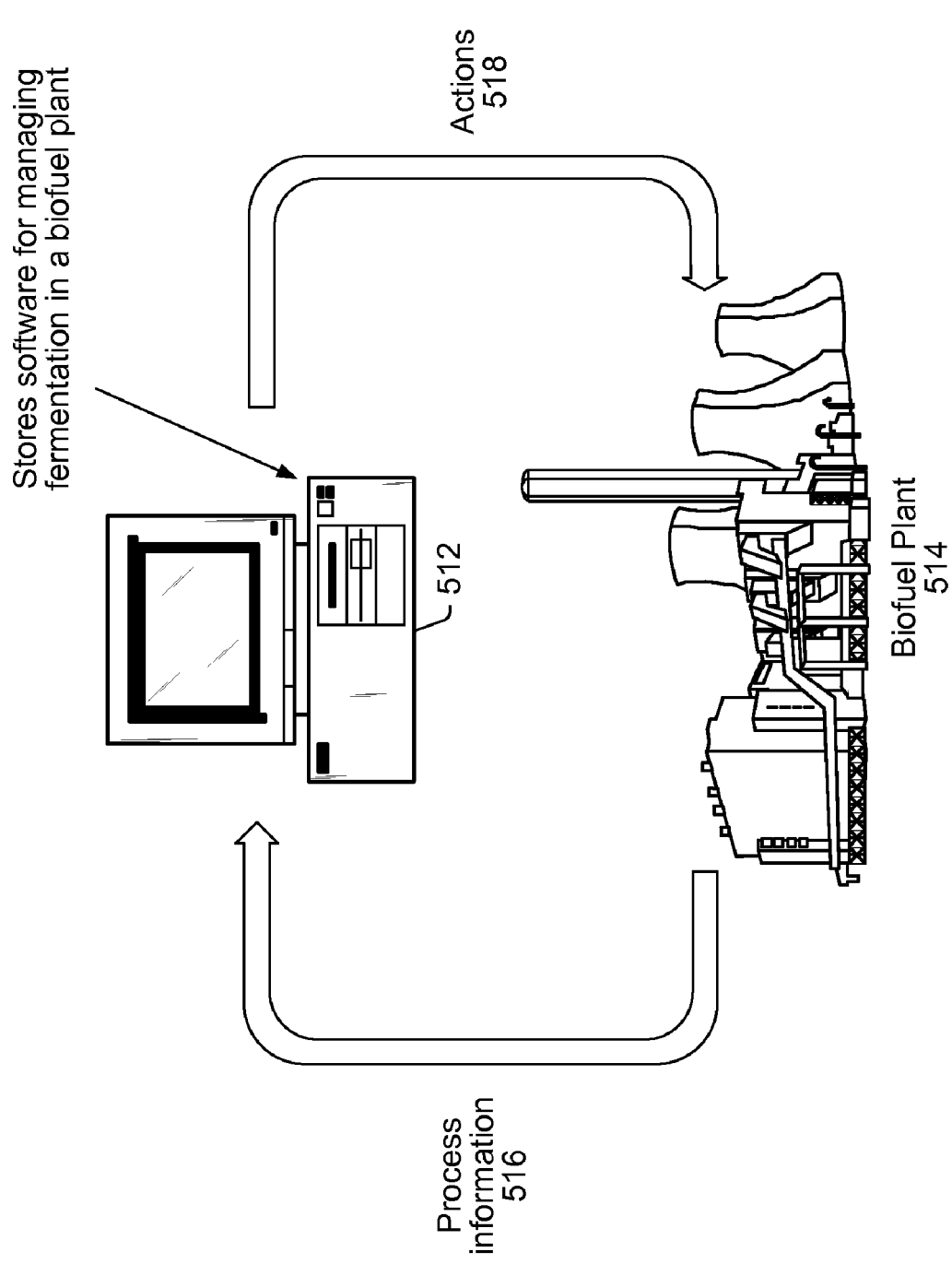
FIG. 5 is a is a simplified view a system for performing model predictive control of fermentation in a biofuel production process, according to one embodiment.

FIG. 5 illustrates a simplified view of an automated control system for a biofuel production plant 514. As shown, the system may include one or more computer systems 512 which interact with the biofuel plant 514 being controlled. The computer system 512 may represent any of various types of computer systems or networks of computer systems, which execute software program(s) according to various embodiments of the invention. As indicated, the computer system stores (and executes) software for managing fermentation temperature in the biofuel plant 514, according to embodiments of the present invention. The software program(s) may perform various aspects of modeling, prediction, optimization and/or control of the fermentation process, as described herein. Thus, the automated control system may implement model predictive control of the fermentation process in the biofuel plant or process. The system may further provide an environment for making optimal decisions using an optimization solver, i.e., an optimizer, and carrying out those decisions, e.g., to control the plant.

It should be noted that as used herein, the terms "maximum", "minimum", and "optimum", may refer respectively to "substantially maximum", "substantially minimum", and "substantially optimum", where "substantially" indicates a value that is within some acceptable tolerance of the theoretical extremum, optimum, or target value. For example, in one embodiment, "substantially" may indicate a value within 10% of the theoretical value. In another embodiment, "substantially" may indicate a value within 5% of the theoretical value. In a further embodiment, "substantially" may indicate a value within 2% of the theoretical value. In yet another embodiment, "substantially" may indicate a value within 1% of the theoretical value. In other words, in all actual cases (non-theoretical), there are physical limitations of the final and intermediate control element, dynamic limitations to the acceptable time frequency for stable control, or fundamental limitations based on currently understood chemical and physical relationships. Within these limitations the control system will generally attempt to achieve optimum operation, i.e., operate at a targeted value or constraint (max or min) as closely as possible.

One or more software programs that perform modeling, prediction, optimization and/or control of the biofuel plant 514 (particularly, the fermentation process) may be included in the computer system 512. Thus, the system may provide an environment for a scheduling process of programmatically retrieving process information 516 relevant to the fermentation process of the plant, and generating actions 518, e.g., control actions, to control the fermentation process, and possibly other processes and aspects of the biofuel plant or process.

The one or more computer systems 512 preferably include a memory medium on which computer programs according to the present invention are stored. The term "memory medium" is intended to include various types of memory or storage, including an installation medium, e.g., a CD-ROM, or floppy disks, a computer system memory or random access memory such as DRAM, SRAM, EDO RAM, Rambus RAM, etc., or a non-volatile memory such as a magnetic medium, e.g., a hard drive, or optical storage. The memory medium may comprise other types of memory as well, or combinations thereof. In addition, the memory medium may be located in a first computer in which the programs are executed, or may be located in a second different computer, which connects to the first computer over a network. In the latter instance, the second computer provides the program instructions to the first computer for execution.

Also, the computer system(s) 512 may take various forms, including a personal computer system, mainframe computer system, workstation, network appliance, Internet appliance or other device. In general, the term "computer system" can be broadly defined to encompass any device (or collection of devices) having a processor (or processors), which executes instructions from a memory medium.

The memory medium (which may include a plurality of memory media) preferably stores one or more software programs for performing various aspects of model predictive control and optimization. The software program(s) are preferably implemented using component-based techniques and/or object-oriented techniques. For example, the software program may be implemented using ActiveX controls, C++ objects, Java objects, Microsoft Foundation Classes (MFC), or other technologies or methodologies, as desired. A CPU, such as the host CPU, executing code and data from the memory medium comprises a means for creating and executing the software program according to the methods or flowcharts described below. In some embodiments, the one or more computer systems may implement one or more controllers, as noted above.

An important insight regarding the fermentation process that contributed to the new control techniques disclosed herein is that this process acts as an integrating control system, rather than a stable control process, so that ultimately the controlled parameter is fermenter heat balance rather than temperature. Thus, as long as the amount of cooling applied to the fermenter is less than the heat generated by metabolic activity the temperature will increase (and vice versa). Thus, an integrating model of temperature based on heat balance may be used to control the fermentation temperature, where changes in temperature are central to the control strategy.

Thus, in some embodiments, a system for controlling the fermentation process may include a controller, specifically, an integrating nonlinear control system on fermentation temperature, i.e., fermenter temperature. Note that since the gain and/or the dynamics is nonlinear with respect to fermenter volume, a nonlinear integrating control model of temperature as a function of fermenter volume (and possibly other variables) may be used for improved (over the prior art) temperature control results, using either the feeding temperature (mash filling the fermenter can be temperature controlled, see, e.g., FIG. 4) and/or the fermenter cooler (chiller). Both of these cooling control means act more rapidly, i.e., have faster dynamics, on temperature at low volumes than at high volumes.

Figure 6:
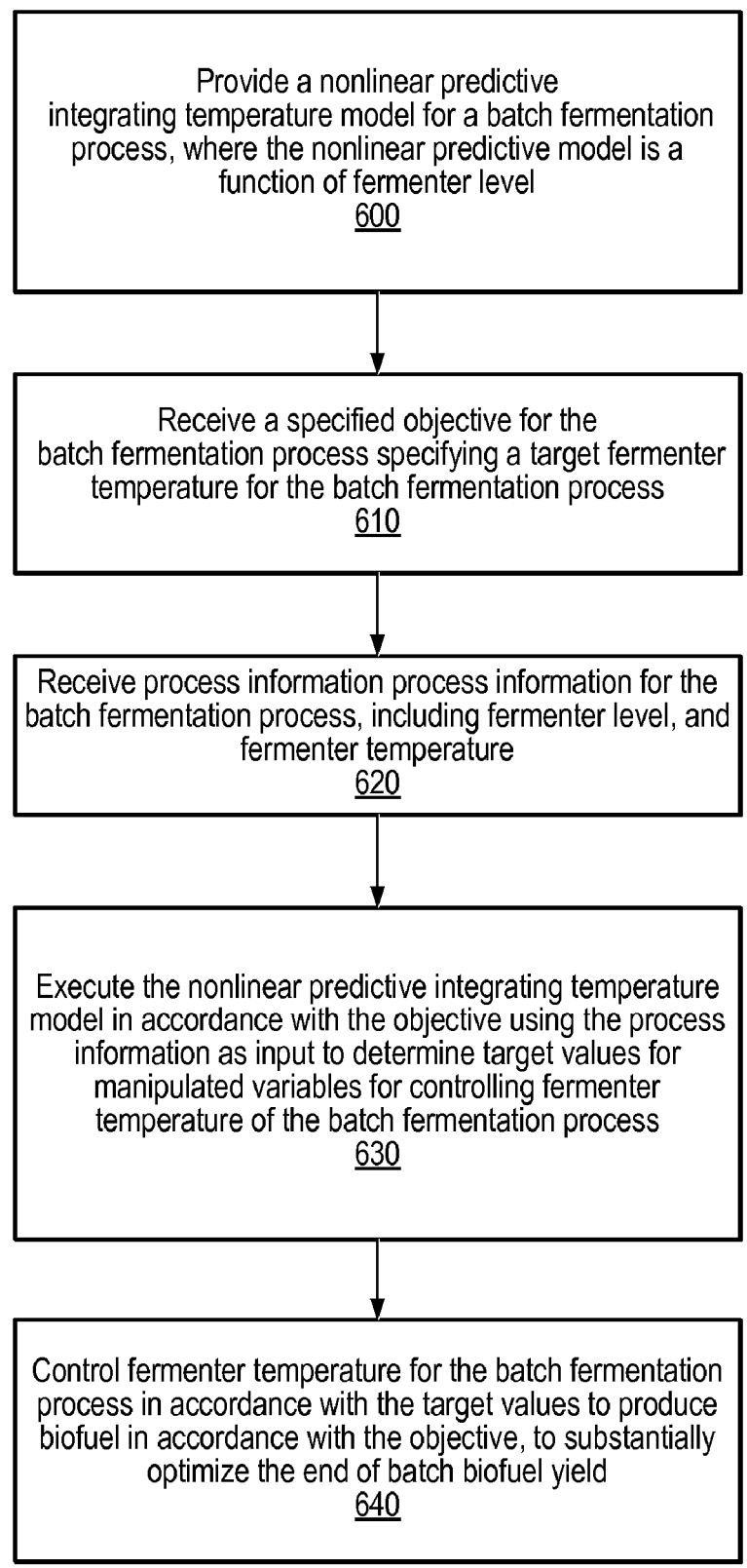
FIG. 6 is a high-level flowchart of a method for controlling temperature of a fermentation process in a biofuel production process utilizing model predictive control, according to one embodiment.

FIG. 6—Method for Controlling Fermentation Temperature

FIG. 6 is a high-level flowchart of a computer-implemented method for controlling fermentation temperature in a fermentation process of a biofuel production process utilizing model predictive control (MPC), according to one embodiment. As used herein, the term biofuel refers to one or more biofuel products output from a biofuel production process. In various embodiments, some of the method elements shown may be performed concurrently, in a different order than shown, or may be omitted. Additional method elements may also be performed as desired. As shown, this method may operate as follows.

In 602, a nonlinear predictive integrating temperature model for a fermentation process may be provided. In other words, a model may be provided that specifies or represents relationships between attributes or variables related to the temperature of the fermentation process, including relationships between inputs to the fermentation process and resulting outputs of the fermentation process. The nonlinear predictive integrating temperature model may be based on heat balance of the fermentation process, including a balance between available cooling and current fermentation heat generation. Note that the model variables may also include aspects or attributes of other processes or sub-processes that have bearing on or that influence operations of the fermentation process.

In preferred embodiments, the nonlinear predictive integrating temperature model (also referred to herein as simply "the predictive model" or "the temperature model") is a function of fermenter level (i.e., fermenter volume), because, as noted above, the temperature dynamics of the fermentation batch changes based on the volume of the fermenting biomass slurry. In preferred embodiments, the nonlinear predictive model is a multivariate model, e.g., the model represents or encodes relationships among multiple parameters, and is operable to receive multiple inputs, and generate multiple outputs.

The model may be of any of a variety of types. For example, the model may be or include one or more of: fundamental or analytical models (i.e., functional physics-based models), empirical models (such as neural networks or support vector machines), rule-based models, statistical models, standard MPC models (i.e., fitted models generated by functional fit of data), or hybrid models using any combination of the above models.

In 604, an objective for the fermentation process may be received. The objective may specify a desired outcome, result, behavior, or state, of the fermentation process, such as, for example, a desired throughput, quality, efficiency, product profile, behavior, or cost, among others. In preferred embodiments, the objective specifies a target fermentation temperature (or temperature profile or trajectory) that is substantially optimal for generation of biofuel, e.g., that is optimal for generation of ethanol by the yeast. In some embodiments, the objective may specify a balance between available cooling and current fermentation heat generation to stabilize fermentation temperature at the target temperature value.

Moreover, in some embodiments, an objective may include multiple components, i.e., may actually comprise a plurality of objectives and sub-objectives. In some embodiments, the objective may involve multiple variables, e.g., a ratio of variables. Moreover, in some embodiments, there may be a global objective, e.g., maximize production or profit, and multiple sub-objectives that may in some cases be at odds with the global objective and/or one another.

It should be noted that preferred embodiments of the present invention are specifically directed to controlling fermenter temperature to some specified target value (or trajectory), and that the particular means or method for determining the target temperature is not germane to the techniques described herein. In other words, given a target temperature (or temperature trajectory), the control techniques discussed herein will attempt to control the fermenter temperature to approach and maintain the target temperature, whatever that target temperature is, and however it may be have been determined.

In 606, process information for the fermentation process of the biofuel production process may be received. This information may be received from the fermentation process, from other portions of the biofuel production process that influence the fermentation process, and/or from other sources, e.g., a laboratory, inferred property models (that model variables that are not readily measurable), sometimes referred to as virtual online analyzers (VOAs), external systems, or any other source as desired. This information generally includes data from one or more sensors monitoring conditions of and in the fermentation process (e.g., temperatures, pressures, flow rates, equipment settings, and so forth), although any other information germane to the fermentation process may be included as desired (e.g., constraints to which the fermentation process may be subject, ambient conditions of the biofuel process, economic or market data, and so forth).

In preferred embodiments, the process information may include fermenter level and fermenter temperature, although the process information may also include other attributes or variables related to the fermentation process, as discussed below.

In 608, the nonlinear predictive integrating temperature model may be executed in accordance with the objective using the received process information as input, to generate model output comprising target values for one or more manipulated variables related to the fermentation process in accordance with the objective for the fermentation process. In other words, the nonlinear predictive integrating temperature model may be executed with the received process information as input, and may determine target values for one or more variables or controllable attributes of the fermentation process in an attempt to meet the specified objective, specifically, to substantially meet and maintain the specified target fermentation temperature.

For example, in an embodiment where the objective is to maximize biofuel output for the fermentation process, the model may determine various target values (e.g., fermentation feed input flows, temperatures, pressures, and so forth) that may operate to maximize the output. As another example, in an embodiment where the objective is to minimize waste for the fermentation process, the model may determine target values that may operate to minimize waste for the fermentation process, possibly at the expense of total biofuel output. In a further example, the objective may be to maximize profit for the entire production process, where maximizing output and minimizing waste may be two, possibly competing, sub-objectives, e.g., included in the objective.

In one embodiment, constraint information specifying one or more constraints for the biofuel production process may be received, e.g., as part of the objective, or separately. Executing the nonlinear predictive integrating temperature model may then include determining the target values subject to the one or more constraints. Note that the constraints may include any limitations on various aspects, variables, or conditions, related to the fermentation process, possibly including dynamic constraints. For example, in various embodiments, the one or more constraints may include one or more of: equipment constraints, capacity constraints, temperature constraints, pressure constraints, energy constraints, market constraints, economic constraints, regulatory constraints, operating limits of product markets that affect production rates of products, and/or operator imposed constraints, among others.

In some embodiments, equipment constraints may include one or more of: operating limits for various pumps, operational status of pumps, holding tank capacities, operating limits for various control valves, operating limits for valve temperatures, operating limits for pipe pressures, operating temperature limits of equipment, operating limits of rotary equipment as measured by amperage, temperature, or other load measurement, and/or safety or environmental limitations for equipment operation. For example, in one embodiment, a constraint on operation of the fermentation feed may relate to pumping limitations on any of the various sections of the fermentation feed pumps and/or pipes. In situations where an objective is to maximize or maintain biofuel output product production rates, or biofuel product quality at certain target rates, this objective may drive a pump to its maximum or minimum limit, and the objective may then be compromised due to equipment/pump limits.

In one embodiment, the one or more equipment constraints may also include one or more of: fermentation equipment capacity limits that limit fermentation process output feed rates to the primary distillation units; equipment constraints that limit thin stillage feed rates or capacity from the stillage process; operating limits for one or more pumps in the thin stillage feed; operational status of pumps (online or offline); thin stillage tank capacities; holding tank level limits that limit feed rates to the fermentation tanks; operating limits for tank pressures; operational status of tanks; pump speed, valve position, or other controller output limits within the primary distillation or fermentation systems; operating limits for valve pressures; operating limits for valve temperatures; equipment amp limits; among others.

In some embodiments, the execution of the model in 608 may include executing the model in an iterative manner, e.g., via an optimizer, e.g., a nonlinear optimizer, varying manipulated variable values (which are a subset of the model inputs) and assessing the resulting model outputs and objective function, to determine values of the manipulated variables that satisfy the objective subject to one or more constraints, e.g., that optimize the sub-process subject to the constraints, thereby determining the target values for the manipulated variables.

In 610, fermenter temperature of the fermentation process may be controlled in accordance with the corresponding targets and objective for the fermentation process, e.g., to substantially optimize the end of batch biofuel yield. Said another way, a controller coupled to the nonlinear predictive model may automatically control various (controllable) aspects or variables of the fermentation process according to the target values output by the predictive model to attempt to achieve the specified objective, specifically, the target fermenter temperature.

The method of FIG. 6 may be repeated, e.g., at a specified frequency, or in response to specified events, so that the process may be monitored and controlled throughout a production process, or throughout a series of production processes. In some embodiments, the period or frequency may be programmed or varied during the production process (e.g., an initial portion of a production process may have longer repetition periods (lower frequency), and a critical portion of a production process may have shorter repetition periods (higher frequency)). Thus, in some embodiments, the above receiving process information, executing the nonlinear predictive integrating temperature model, and controlling, may be repeated in an iterative manner to substantially optimize biofuel production over a fermentation batch.

In some embodiments, a system implementing the control techniques disclosed herein may include a computer system with one or more processors, and may include or be coupled to at least one memory medium (which may include a plurality of memory media), where the memory medium stores program instructions according to embodiments of the present invention. In various embodiments, the controller(s) discussed herein may be implemented on a single computer system communicatively coupled to the biofuel plant, or may be distributed across two or more computer systems, e.g., that may be situated at more than one location. In this embodiment, the multiple computer systems comprising the controller(s) may be connected via a bus or communication network.

Figure 7:
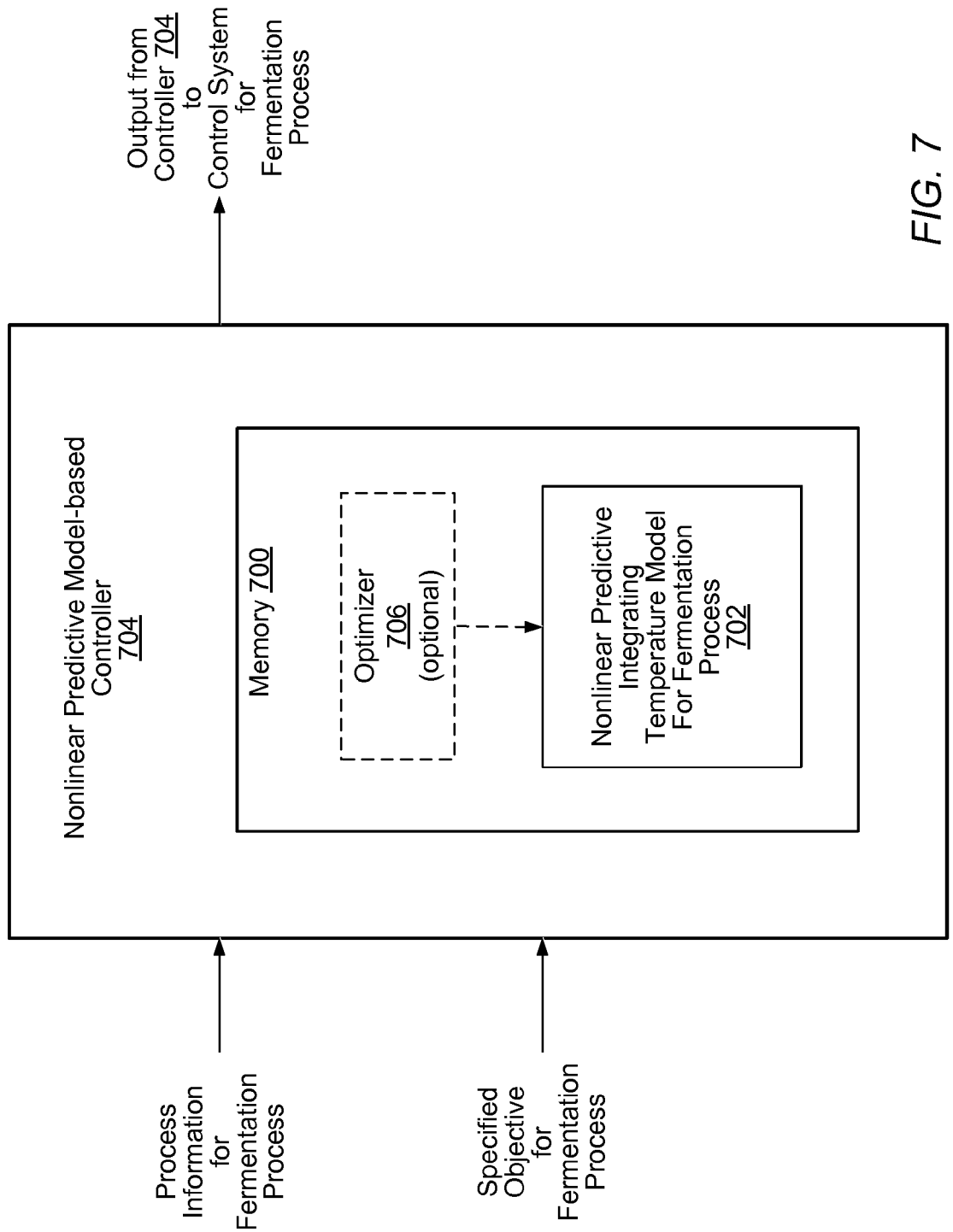
FIG. 7 is a high-level diagram of a control system for controlling fermenter temperature in a biofuel production process utilizing model predictive control, according to one embodiment.

FIG. 7 illustrates an exemplary system for managing a fermentation process of a biofuel production process, which may implement embodiments of the method of FIG. 6. The system may comprise a nonlinear predictive integrating temperature model 702 stored in a memory medium 700 coupled to or included in a nonlinear predictive model-based controller 704 (e.g., a computer system), as shown. In some embodiments, the memory medium 700 may be part of the controller 704. In other embodiments, the memory medium 700 may be separated from the controller 704 and connected via a bus or a communication network. As mentioned above, in some embodiments, the system may include an optimizer, which may iteratively execute the predictive model to determine the target values for controlling the fermentation process. In one embodiment, the memory medium 700 may include a plurality of memory media, e.g., with different portions of the model 702 stored in two or more of the memory media, e.g., via a storage area network, or other distributed system. Moreover, as discussed below in more detail, in some embodiments, the two or more memory media may store a respective two or more models, e.g., the nonlinear predictive integrating temperature model 702, and a "slave" control model, for use in a cascaded control strategy.

As described in more detail with respect to FIG. 6, the controller 704, e.g., the memory medium 700 may store the nonlinear predictive integrating temperature model, as well as program instructions executable to: receive an objective for a fermentation process, including a target fermenter temperature (which may be a single value or a target temperature trajectory), receive process information related to the fermentation process from the biofuel production process (possibly including information from a laboratory and/or inferred property models), including fermenter level and temperature, execute the model in accordance with the objective for the fermentation process using the received process information as input, to generate model output comprising target values for one or more manipulated variables related to the fermentation process in accordance with the objective for the fermentation process. In addition, as described above with respect to FIG. 6 in more detail, the nonlinear predictive model-based controller 704 may control fermentation temperature of the fermentation process in accordance with the corresponding targets and objective for the fermentation process, e.g., via actuators/valves, other controllers, etc., e.g., to substantially optimize the end of batch biofuel yield.

For example, in one embodiment, the controller 704 may output the target values to a control system (not shown in FIG. 7), e.g., a distributed control system, for the biofuel production plant. In some embodiments, the target values may include or be one or more trajectories of values over a time horizon, e.g., over a prediction or control horizon. Process information may include measurements of a plurality of process variables for the fermentation process and other interrelated sub-processes, information on one or more constraints, and/or information about one or more disturbance variables related to the fermentation process. Process information may be received from the distributed control system for the biofuel plant, entered by an operator, or provided by a program. For example, in addition to values read (by sensors) from the actual process, the process information may include laboratory results, and output from inferred property models, e.g., virtual online analyzers (VOAs), among other information sources.

Further Embodiments

The following describes further embodiments of the above-described systems and methods.

In various embodiments, in addition to fermenter level, the predictive model may also be a function of other variables, such as, but not limited to, one or more of: cooling water valve position, cooled fermentation broth return temperature, cooling water supply temperature, batch fermentation time, and biofuel concentration, among others. In some embodiments, the predictive model may model metabolic activity of yeast in the batch fermentation process, e.g., as a function of one or more of: ethanol concentration, sugar concentration, enzyme concentration, batch time, or integrated cooling quantity, among others. The predictive model may use these modeled relationships to predict and control fermentation temperature over the fermentation batch. In other words, the target values may be determined based at least in part on the modeled metabolic activity of yeast in the batch fermentation process.

For example, the model may include feed forward projection of metabolic activity, where, as discussed above, in each fermenter metabolic activity typically increases with time up to some peak, after which it begins to diminish due to either high ethanol concentration (toxicity/equilibrium) or low sugar availability, and from that point on generally diminishes. Note that there is the possibility with staged amylase enzyme addition that initially sugar concentration may proceed through several stages of activity (e.g. increase and decrease), but in general this is forcastable as long as enzyme staging is controlled, measured, or managed by recipe. Temperature control may be improved by including this type of feed-forward disturbance rejection in the model. Disturbance variables to which the model may respond may include batch time, integrated cooling quantity, ethanol concentration, and/or sugar concentration, among others.

In further embodiments, the nonlinear predictive integrating temperature model may also be a function of one or more of: cooled fermentation broth return temperature, cooling water supply temperature, batch fermentation time, or biofuel concentration. Similarly, the process information may further include one or more of: cooled fermentation broth return temperature, cooling water supply temperature, batch fermentation time, or biofuel concentration. Moreover, the manipulated variables may further include one or more of: cooled fermentation broth return temperature, fermentation fill temperature, and chilled water valve position. Thus, in various embodiments, the method may be dependent on or utilize any of various attributes or variables related to the fermentation process.

For example, in one embodiment, the nonlinear predictive integrating temperature model may model dependence of fermenter temperature on cooling water valve settings of a fermentation cooling exchanger for the fermenter, where the target values include a target cooling water valve setting for the fermentation cooling exchanger. Controlling fermenter temperature may include adjusting the cooling water value in accordance with the target cooling water valve setting to substantially maintain target fermenter temperature for the fermentation batch process.

In some cases, a major disturbance (uncontrollable effect) to the control system can occur based on available cooling water temperature. For example, cooling water temperature (see FIG. 4) may vary based on ambient conditions, e.g., the amount of direct sunlight, weather conditions, etc.

In one embodiment, the nonlinear predictive integrating temperature model may also model the relationship between cooling water temperature and batch fermenter temperature. This may allow the nonlinear predictive integrating temperature model to predict the impact of cooling water supply temperature on fermenter heat balance. Thus, the predictive model may directly, or indirectly (via a secondary or cascaded controller), adjust a cooling water valve setting to preemptively maintain fermentation batch temperature, i.e., to adjust the amount of cooling prior to the fermentation temperature moving off target, e.g., in response to some disturbance in cooling water supply.

In a more detailed embodiment, the nonlinear predictive integrated temperature model may include a feed forward disturbance model on fermenter temperature that models the effect of cooling water temperature on the fermenter temperature. In this case when cooling water supply temperature increases or decreases, its impact on the fermenter heat balance (temperature deviation) may be predicted and a cooling water valve change can be predicted and corrected prior to changes in fermenter temperature. In other words, the nonlinear predictive integrating temperature model may model a relationship between cooling water supply temperature and batch fermenter temperature, where the nonlinear predictive integrating temperature model may be operable to predict the impact of cooling water supply temperature on fermenter temperature. The target values may thus include a change in a cooling water valve setting to preemptively maintain fermentation batch temperature against disturbances in cooling water supply temperature, e.g., before the fermenter temperature deviates significantly from the target value.

In another embodiment, the system may include another (e.g., local) controller, e.g., a slave controller under control of the fermenter temperature control, where the slave controller controls cooled fermentation mash temperature (e.g. the temperature of the return line back to the fermenter from the cooler), or more specifically, fermentation cooling exchanger return temperature. Note that the fermentation cooling exchanger return temperature responds rapidly (more rapidly than the entire fermenter) to cooling water temperature variation, and so can be relatively simply managed by maintaining a constant temperature of cooled (return) mash. Thus, the nonlinear integrating fermenter temperature controller may manipulate the cooled fermenter broth return temperature using a cascaded controller scheme to control a cooling water valve of the fermentation cooling exchanger.

Figure 8:
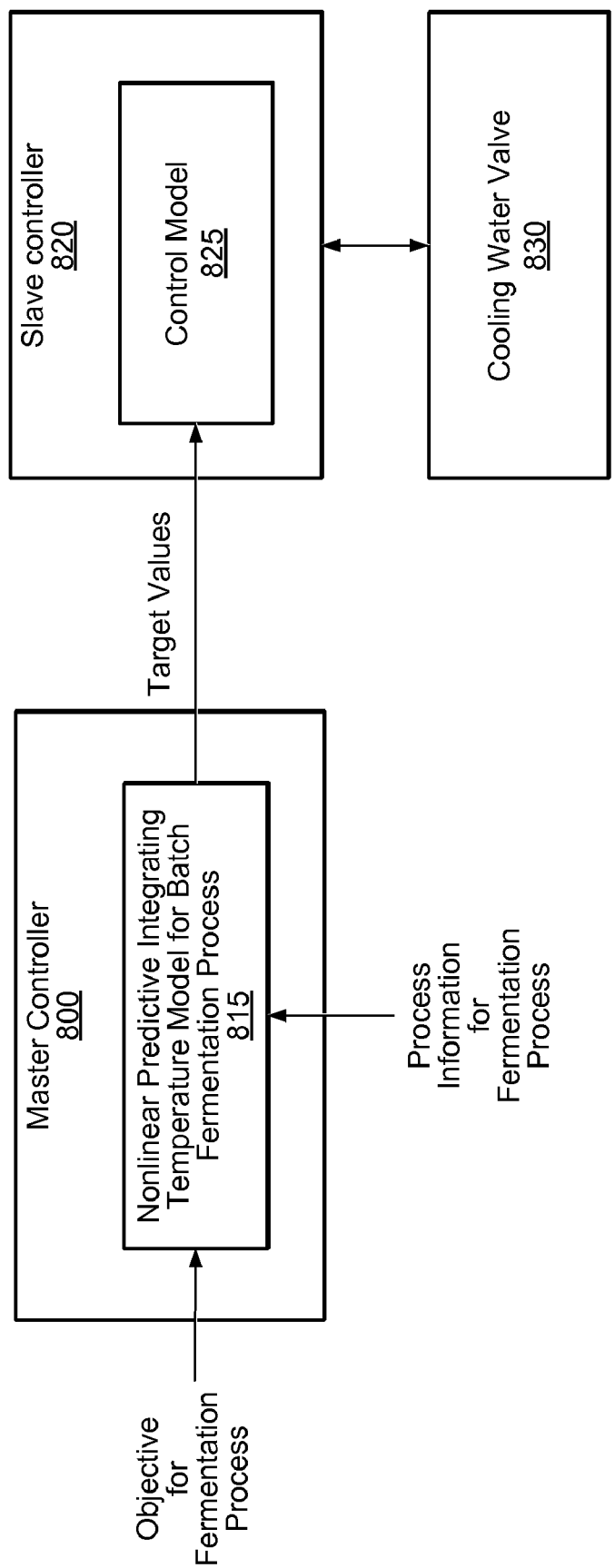
FIG. 8 is a high-level block diagram of a system for controlling fermenter temperature in a biofuel production process utilizing cascaded controllers, according to one embodiment.

FIG. 8 illustrates an embodiment where cascading controllers are used to implement the method of FIG. 6. As FIG. 8 shows, a master controller 800 stores or is coupled to the nonlinear predictive integrated temperature model described above. In this embodiment, a master controller 800 (with processor, memory medium, etc.) includes a nonlinear predictive integrating temperature model 815 for batch fermentation, and is coupled to a slave controller, i.e., a cascaded controller, 820, which is itself coupled to a cooling water valve 830.

The nonlinear predictive integrating temperature model 815 may model dependence of fermenter temperature on fermentation cooling exchanger return temperature of a fermentation cooling exchanger for the fermenter. The target values (generated by the execution of the temperature model) may include a target fermentation cooling exchanger return temperature.

Controlling fermenter temperature may include the integrating nonlinear predictive integrating temperature model providing the target fermentation cooling exchanger return temperature to a cascaded controller (e.g., slave controller 820) of fermentation cooling exchanger return temperature, where the cascaded controller of fermentation cooling exchanger return temperature include a control model (e.g., control model 825) that models dependence of fermentation cooling exchanger return temperature on cooling water valve settings for the fermentation cooling exchanger. The cascaded controller may execute the control model in accordance with the target fermentation cooling exchanger return temperature to determine a target cooling water valve setting to achieve the target fermentation cooling exchanger return temperature, and cascaded controller may adjust the cooling water valve (e.g., cooling water valve 830) in accordance with the target cooling water valve setting to substantially maintain target fermenter temperature for the fermentation batch process.

In some embodiments, the nonlinear predictive integrating temperature model may model dependence of fermenter temperature on fermentation feed temperature. The target values (generated by the execution of the temperature model) may include a target fermentation feed temperature, and controlling fermenter temperature may include controlling cooling of the fermentation feed in accordance with the target fermentation feed temperature to substantially maintain target fermenter temperature for the fermentation batch process. In other words, in addition to, or instead of, controlling fermenter temperature via the fermentation cooling exchanger return temperature, the temperature of fermentation feed may be used.

Note that over the fill, fermentation, and emptying phases of the fermentation process, the changes in fermenter volume (volume of the fermentation mash) may introduce additional control issues. For example, in some cases, fermenter temperature may be measured by a sensor, e.g., a thermocouple, which is situated at a certain level in the tank. During filling and/or emptying, this sensor may not be able to determine the fermenter temperature accurately. Thus, in some embodiments, a combination of the above techniques may be used.

In one embodiment, the fermenter has a first level below which accurate fermenter temperature is not available, and above which accurate fermenter temperature is available. The nonlinear predictive integrating temperature model being a function of fermenter level may include the following.

For fermenter levels below the first level, the nonlinear predictive integrating temperature model may model dependence of fermenter temperature on fermentation feed temperature, and the target values may include a target fermenter feed temperature. Controlling fermenter temperature may include controlling the fermentation feed temperature in accordance with the target fermentation feed temperature to substantially maintain target fermenter temperature for the fermentation batch process. For fermenter levels above the first level, the nonlinear predictive integrating temperature model may model dependence of fermenter temperature on cooling water valve settings of a fermentation cooling exchanger for the fermenter, and the target values may include a target cooling water valve setting for the fermentation cooling exchanger. Controlling fermenter temperature may then include adjusting the cooling water value in accordance with the target cooling water valve setting to substantially maintain target fermenter temperature for the fermentation batch process. Thus, the nonlinear predictive integrating temperature model may be used to control the cooling water value directly.

In another embodiment, a cascaded control scheme may be used, similar to that described above with respect to FIG. 8. In this embodiment (as with the above) the fermenter has a first level below which accurate fermenter temperature is not available, and above which accurate fermenter temperature is available. The nonlinear predictive integrating temperature model being a function of fermenter level may include the following.

For fermenter levels below the first level, the nonlinear predictive integrating temperature model may model dependence of fermenter temperature on fermentation feed temperature, where the target values include a target fermenter feed temperature. Controlling fermenter temperature may include controlling the fermentation feed temperature in accordance with the target fermentation feed temperature to substantially maintain target fermenter temperature for the fermentation batch process.

For fermenter levels above the first level, the nonlinear predictive integrating temperature model may model dependence of fermenter temperature on fermenter cooling exchanger return temperature, and the target values may include a target fermentation cooling exchanger return temperature. Controlling fermenter temperature may then include the integrating nonlinear predictive integrating temperature model providing the target fermentation cooling exchanger return temperature to a cascaded controller of fermentation cooling exchanger return temperature. The cascaded controller of fermentation cooling exchanger return temperature may include a control model (e.g., control model 830 of FIG. 8) that models dependence of fermentation cooling exchanger return temperature on cooling water valve settings of a fermentation cooling exchanger for the fermenter. The cascaded controller may execute the control model in accordance with the target fermentation cooling exchanger return temperature to determine a target cooling water valve setting to achieve the target fermentation cooling exchanger return temperature. Finally, the cascaded controller may adjust the cooling water valve in accordance with the target cooling water valve setting to substantially maintain target fermenter temperature for the fermentation batch process.

Thus, in some embodiments, controlling both fermentation feed temperature and fermentation cooling exchanger return temperature may be used to control fermenter temperature, depending on fermenter volume, thus improving temperature control for the fermenter over the entire batch cycle.

Thus, various embodiments of the above model predictive control systems and methods may be used to control temperature of a fermentation process in a biofuel production process.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A method of controlling the temperature of a batch fermenter in a biofuel production process, comprising:
   providing a nonlinear predictive integrating temperature model for a batch fermentation process, wherein the nonlinear predictive integrating temperature model is a function of the volume of the fermentation mash, and
      models the dependence of fermenter temperature on fermentation feed temperature when the volume the of fermentation mash is below a designated level, and
      models the dependence of fermenter temperature on cooling water valve settings of a cooling exchanger when the volume of the fermentation mash is above the designated level;
   receiving an objective for the batch fermentation process specifying a target fermenter temperature for the batch fermentation process;
   receiving process information for the batch fermentation process, comprising the volume of the fermentation mash and fermenter temperature;
   executing the nonlinear predictive integrating temperature model to achieve the objective using the process information as input thereby determining a target fermentation feed temperature or a target cooling water valve setting; and
   adjusting the fermentation feed temperature in accordance with the target fermentation feed temperature when the volume of the fermentation mash is below the designated level; and
   adjusting the cooling water value settings of the cooling exchanger in accordance with the target cooling water valve setting when the volume of the fermentation mash is above the designated level.

2. The method of claim 1, wherein the nonlinear predictive integrating temperature model further models heat balance of the fermentation process, comprising a balance between available cooling and current fermentation heat generation.

3. The method of claim 1,
   wherein the nonlinear predictive integrating temperature model further models a relationship between cooling water supply temperature and batch fermenter temperature, wherein the nonlinear predictive integrating temperature model is operable to predict the impact of cooling water supply temperature on fermenter temperature; and
   wherein the target values comprise a change in a cooling water valve setting to preemptively maintain fermentation batch temperature against disturbances in cooling water supply temperature.

4. The method of claim 1, wherein the nonlinear predictive integrating temperature model further models metabolic activity of yeast in the batch fermentation process as function of one or more of:
   ethanol concentration;
   sugar concentration;
   enzyme concentration;
   batch time; or
   integrated cooling quantity; and
   wherein the target values are determined based at least in part on the modeled metabolic activity of yeast in the batch fermentation process.

5. The method of claim 1; further comprising:
   repeating said receiving process information, said executing the nonlinear predictive integrating temperature model, and said controlling in an iterative manner to substantially optimize biofuel production over a fermentation batch.

6. The method of claim 1; wherein the target temperature comprises a target temperature trajectory for the fermentation batch.

7. The method of claim 1, further comprising receiving constraint information specifying one or more constraints for the biofuel production process, wherein said executing the nonlinear predictive integrating temperature model comprises determining the target values subject to the one or more constraints.

8. A system for controlling the temperature of a batch fermenter in a biofuel production process, comprising:
   a fermenter,
   at least one processor coupled to the fermenter; and
   at least one memory medium coupled to the at least one processor, wherein the at least one memory medium stores:
      a nonlinear predictive integrating temperature model for a batch fermentation process, wherein the nonlinear predictive integrating temperature model is a function of the volume of the fermentation mash, and—
         models the dependence of fermenter temperature on fermentation feed temperature when the volume of the fermentation mash is below a designated level, and
         models the dependence of fermenter temperature on cooling water valve settings of a cooling exchanger when the volume of the fermentation mash is above the designated level;
      program instructions that, when executed by the processor, cause the processor to:
         receive an objective for the batch fermentation process specifying a target fermenter temperature for the batch fermentation process;

receive process information for the batch fermentation process, comprising the volume of the fermentation mash and fermenter temperature;

execute the nonlinear predictive integrating temperature model to achieve the objective using the process information as input thereby determining a target fermentation feed temperature or a target cooling water valve setting;

adjust the fermentation feed temperature in accordance with the target fermentation feed temperature when the volume of the fermentation mash is below the designated level; and adjust the cooling water value settings in accordance with the target cooling water valve setting when the volume of the fermentation mash is above the designated level.

9. A method of controlling the temperature of a batch fermenter in a biofuel production process, comprising:

providing a nonlinear predictive integrating temperature model for a batch fermentation process, wherein the nonlinear predictive integrating temperature model is a function of the volume of the fermentation mash, and models the dependence of fermenter temperature on fermentation feed temperature when the volume of fermentation mash is below a designated level, and models the dependence of fermenter temperature on fermenter cooling exchanger return temperature when the volume of fermentation mash is above the designated level;

receiving an objective for the batch fermentation process specifying a target fermenter temperature for the batch fermentation process;

receiving process information for the batch fermentation process, comprising the volume of the fermentation mash and fermenter temperature;

executing the nonlinear predictive integrating temperature model to achieve the objective using the process information as input thereby determining a target fermentation feed temperature or a target cooling exchanger return temperature, adjusting the fermentation feed temperature in accordance with the target fermentation feed temperature when the volume of the fermentation mash is below the designated level, and adjusting the cooling exchanger return temperature via a cascaded controller when the volume of the fermentation mash is above the designated level, wherein the cascaded controller determines a target cooling water value setting according to the target cooling exchanger return temperature and adjusts the cooling water value setting according to the determined target setting.

10. The method of claim 9, wherein the nonlinear predictive integrating temperature model further models heat balance of the fermentation process, comprising a balance between available cooling and current fermentation heat generation.

11. The method of claim 9, wherein the nonlinear predictive integrating temperature model further models a relationship between cooling water supply temperature and batch fermenter temperature, wherein the nonlinear predictive integrating temperature model is operable to predict the impact of cooling water supply temperature on fermenter temperature; and wherein the target values comprise a change in a cooling water valve setting to preemptively maintain fermentation batch temperature against disturbances in cooling water supply temperature.

12. The method of claim 9, wherein the nonlinear predictive integrating temperature model further models metabolic activity of yeast in the batch fermentation process as function of one or more of: ethanol concentration; sugar concentration; enzyme concentration; batch time; or integrated cooling quantity; and wherein the target values are determined based at least in part on the modeled metabolic activity of yeast in the batch fermentation process.

13. The method of claim 9, further comprising: repeating said receiving process information, said executing the nonlinear predictive integrating temperature model, and said controlling in an iterative manner to substantially optimize biofuel production over a fermentation batch.

14. The method of claim 9, wherein the target temperature comprises a target temperature trajectory for the fermentation batch.

15. The method of claim 9, further comprising receiving constraint information specifying one or more constraints for the biofuel production process, wherein said executing the nonlinear predictive integrating temperature model comprises determining the target values subject to the one or more constraints.

16. A system for controlling the temperature of a batch fermenter in a biofuel production process, comprising:

a fermenter, at least one processor coupled to the fermenter; and at least one memory medium coupled to the at least one processor, wherein the at least one memory medium stores:

a nonlinear predictive integrating temperature model for a batch fermentation process, wherein the nonlinear predictive integrating temperature model is a function of the volume of the fermentation mash, and models the dependence of fermenter temperature on fermentation feed temperature when the volume of the fermentation mash is below a designated level, and models the dependence of fermenter temperature on cooling water valve settings of a cooling exchanger when the volume of the fermentation mash is above the designated level;

program instructions that, when executed by the processor, cause the processor to:

receive an objective for the batch fermentation process specifying a target fermenter temperature for the batch fermentation process, receive process information for the batch fermentation process, comprising the volume of the fermentation mash and fermenter temperature, execute the nonlinear predictive integrating temperature model to achieve the objective using the process information as input thereby determining target values a target fermentation feed temperature or a target cooling exchanger return temperature, adjust the fermentation feed temperature in accordance with the target fermentation feed temperature when the volume of the fermentation mash is below the designated level, and adjust the cooling exchanger return temperature via a cascaded controller when the volume of the fermentation mash is above the designated level.

* * * * *